United States Patent Office 3,014,956
Patented Dec. 26, 1961

3,014,956
PENTAVALENT PHOSPHORUS ESTERS
Gail H. Birum, Dayton, Ohio, assignor to Monsanto Chemical Company, St. Louis, Mo., a corporation of Delaware
No Drawing. Filed July 21, 1959, Ser. No. 828,464
19 Claims. (Cl. 260—461)

The present invention relates to organic compounds of phosphorus and more particularly provides a new and valuable class of compounds having a plurality of pentavalent phosphorus ester radicals, the method of preparing the same, and leaded hydrocarbon fuels containing the presently provided compounds as preignition agents.

An object of the present invention is to provide polyphosphorus esters wherein phosphorus is present only in the pentavalent state. Another object of the invention is to provide polyphosphorus esters of good hydrolytic stability. Still another object of the invention is to provide a means of improving the hydrolytic stability of certain compounds containing one or more pentavalent phosphorus ester radicals and a single trivalent phosphorus ester radical by changing the latter into the pentavalent phosphorus ester radical. A further object of the invention is to provide stable, chlorine-containing, organic phosphorus compounds for use as preignition and spark plug antifouling agents for leaded gasoline.

These and other objects hereinafter disclosed are provided by the invention wherein there are prepared compounds having a plurality of pentavalent phosphorus ester radicals and being selected from the class consisting of phosphorus diesters of the formula

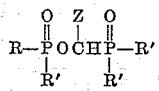

and polyesters of the formula

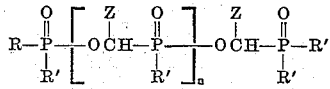

wherein R is selected from the class consisting of haloalkyl, haloalkenyl, alkoxyhaloalkyl and aryloxyhaloalkyl radicals of from 1 to 12 carbon atoms wherein halo denotes chlorine or bromine, R' is selected from the class consisting of —OR, —O-hydrocarbyl and hydrocarbyl radicals of from 1 to 12 carbon atoms and aromatic halohydrocarbyl radicals of from 6 to 12 carbon atoms, Z is selected from the class consisting of hydrogen, hydrocarbyl, halohydrocarbyl, cyanohydrocarbyl, carboalkoxyhydrocarbyl, alkoxyhydrocarbyl and alkylthiohydrocarbyl radicals of from 1 to 17 carbon atoms and the thienyl and furyl radicals and n is a number of at least 1.

Compounds of the above formula are prepared by heating the reaction products obtained by mixing together a phosphoro- or phosphonohalidite, an aldehyde and a trivalent phosphorus ester. Temperatures of, say, 135° C. to 225° C., depending upon the nature of said reaction products, are employed. Generally, temperatures of 165° C. to 210° C. are preferred. As disclosed in my copending application Serial No. 780,262, filed December 15, 1958, mixing together bis(2-chloroethyl) phosphorochloridite, acetaldehyde and tris(2-chloroethyl) phosphite in substantially equimolar proportions gives (I) the bis(2-chloroethyl) phosphite of bis(2-chloroethyl) 1-hydroxyethylphosphonate, thus:

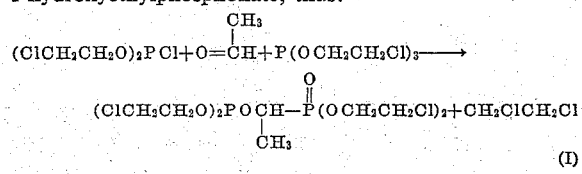

The compound (I) has the general formula

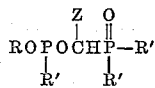

wherein R, R' and Z are as herein defined. I have now found that compounds of this general formula isomerize upon heating, say, at a temperature of from 135°–225° C. to give esters in which no trivalent phosphorus is present, thus:

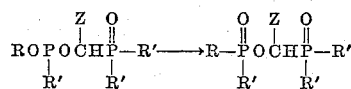

In the case of the above compound (I), the isomerization takes place according to the scheme:

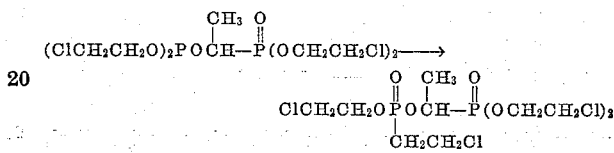

The product thus obtained is a diphosphonate, rather than a phosphite-phosphonate.

Also useful for the preparation of compounds having more than one pentavalent phosphorus ester radical and no trivalent phosphorus are compounds obtained from phosphorochloridites having dissimilar alcohol residues; for example, methyl 2-chloroethyl phosphorochloridite, butyraldehyde and tris(2-chloropropyl) phosphite react in equimolar proportions to give a phosphite-phosphonate which upon heat treatment is converted as follows:

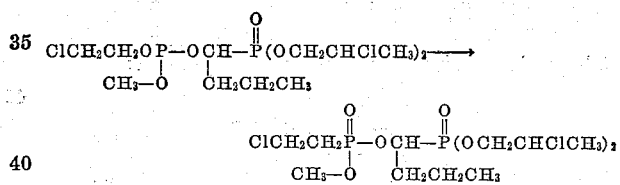

It will be noted that in the isomerization only a halogen-containing alcohol residue of the phosphorohalidite reactant is involved. Hence, products prepared from a phosphorohalidite, an aldehyde and a phosphonite or phosphinite instead of a phosphite likewise give pentavalent phosphorus diesters or polyesters. The equimolar reaction product of, say, bis(2-chloropropyl) phosphorochloridite, propionaldehyde and diethyl phenylphosphonite isomerizes as follows:

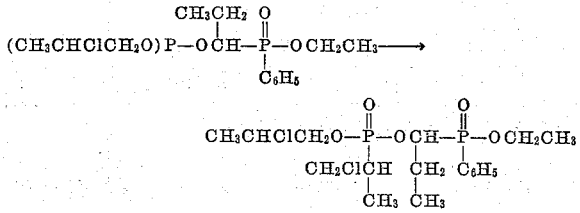

The isomerization product obtained from the equimolar reaction product of a phosphinite such as ethyl di-n-propylphosphinite and the same phosphorochloridite and the same aldehyde has the structure

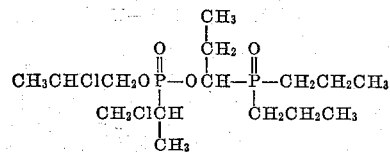

The compound which is formed from a 1:1:1 molar mixture of the trivalent phosphorus halogen compound, the aldehyde and the trivalent phosphorus ester is a phosphite-phosphonate when the ester and the halidite are derived from phosphorous acid, thus:

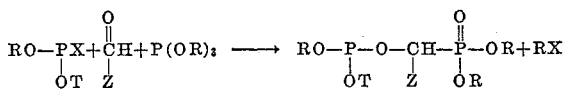

where R is selected from the class consisting of haloalkyl, haloalkenyl, alkoxyhaloalkyl and aryloxyhalo-alkyl radicals of from 1 to 12 carbon atoms, and T is selected from the class consisting of R and alkly radicals of from 1 to 12 carbon atoms. It isomerizes upon heating to give the diphosphonate

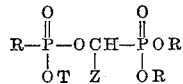

When the ester and the halidite are derived from a hydrocarbyl or halohydrocarbylphosphonous acid, the 1:1:1 product is a phosphonite-phosphinate, thus:

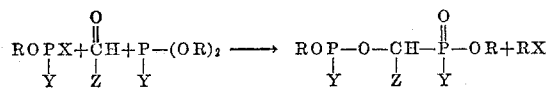

where Y is a hydrocarbyl or halohydrocarbyl radical. It isomerizes to give the diphosphinate:

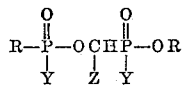

When the ester is derived from phosphorous acid and the halidite is derived from a phosphonous acid, the 1:1:1 product is a phosphonite-phosphonate, thus:

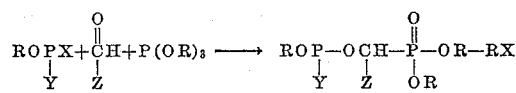

It isomerizes to give the phosphinate-phosphonate:

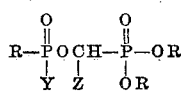

When the ester is derived from a phosphonous acid and the halidite is derived from phosphorous acid, the product is a phosphite-phosphinate, thus:

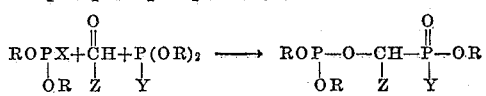

It is heat isomerized to give the phosphonate-phosphinate:

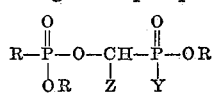

When the ester is derived from phosphinous acid and the halidite is derived from a phosphorous acid, the product is a phosphite-phosphine oxide:

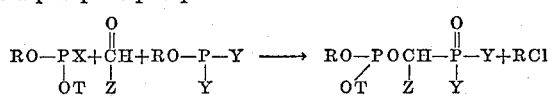

It isomerizes according to this invention to give the phosphonate-phosphine oxide:

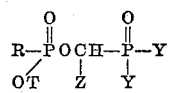

Similarly, with the same ester and a phosphonohalidite instead of the phosphorohalidite, the product is a phosphonite-phosphine oxide:

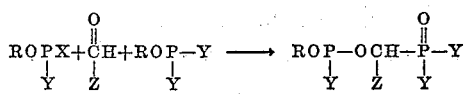

It isomerizes to give the phosphinate-phosphine oxide:

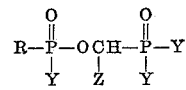

The 1:1:1 reaction products are thus phosphite-phosphonates, phosphonite - phosphinates, phosphonite-phosphonates, phosphite - phosphinates, phosphite-phosphine oxides, or phosphonite-phosphine oxides. There is always present one trivalent phosphorus ester group and one pentavalent phosphorus ester group. According to the present invention these 1:1:1 reaction products are isomerized by heating at 135° C.–225° C. to give diphosphonates, diphosphinates, phosphinate-phosphonates, phosphonate-phosphinates, phosphonate-phosphine oxides, and phosphinate-phosphine oxides.

Also isomerized upon heating at, say, 135°–225° C., are the polyphosphorus esters disclosed in my copending application, Serial No. 820,618 filed June 16, 1959 which esters are formed when a mole of the trivalent phosphorus halogen compound and a mole of an aldehyde are contacted with less than one mole of the phosphorus ester. The polyphosphorus esters disclosed in said copending application have the formula

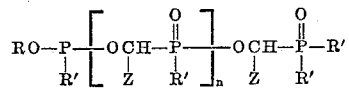

where R, R' and Z are as above defined and $n$ is at least one.

The products provided by the present invention are prepared by heat isomerization of the above. The present compounds, having no trivalent phosphorus, have the formula:

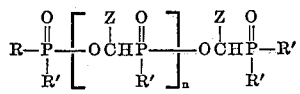

wherein R, R' and Z are as herein defined and $n$ has a value of at least one. It will be noted that the above formula is like that of the isomerization products of the compounds obtained from equimolar mixtures of the phosphorus halogen compound, the aldehyde and the phosphorus ester, except for the unit or units

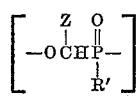

Products having one or more of said units are prepared from poly-phosphorus compounds that are obtained when in a mixture of the phosphorus halogen compound, the aldehyde, and the ester, the latter is present in less than equimolar quantity with respect to each of the other two reactants. In this case a reaction takes place by a chain mechanism whereby, owing to the depletion of the originally present phosphorus ester, the ester which is formed reacts with the halidite and aldehyde that are either still present or are added to the reaction mixture, thus:

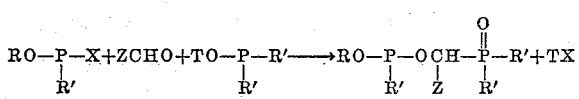

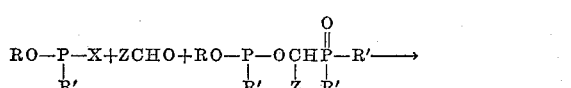

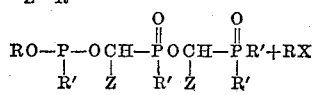

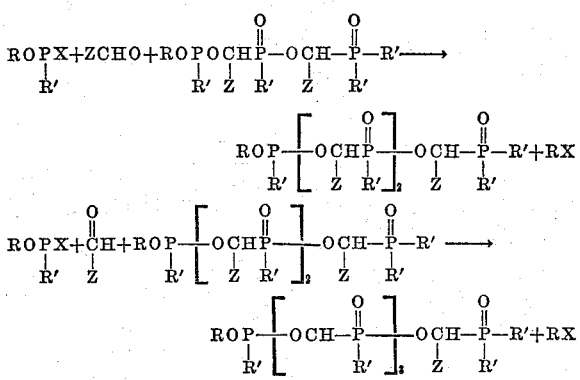

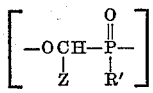

wherein R, R' and Z are as herein defined, X is chlorine or bromine, and T is an alkyl or haloalkyl radical of 1 to 12 carbon atoms.

From the above, it is apparent that the presence of repeating units

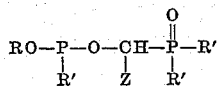

in a product prepared from the ester $R'_2POR$, the phosphorus halide and the aldehyde depends upon whether the quantity of the phosphite present in the initial reaction mixture is less on a molar basis than the quantity of phosphorohalidite and aldehyde. Whenever it is less, the 1:1:1 reaction product

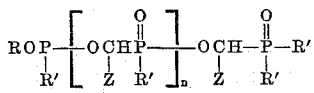

functions as a trivalent phosphorus ester $R'P(OR)_2$, and reacts with the excess of halidite and aldehyde present. As shown schematically above, the product thus formed in turn functions as a trivalent phosphorus ester in the reaction with halidite and aldehyde so that, depending upon the available halidite and aldehyde, there are obtained polyphosphorus compounds of the formula ROP┌─OCH P─┐─OCH─P─R'
  R'└  Z R' ┘n   Z  R' where $n$ is at least 1. The value of $n$ increases rapidly owing to the participation of the successively formed intermediate ester products, so that when there is present a large excess of the halidite and the aldehyde, or when these two reactants are constantly replenished, $n$ is a number of, say, from 1 to 100. Generally, the product consists of mixtures of compounds of the above formula in which there are present products wherein the value of $n$ varies.

Although a convenient means of preparing the presently used polyphosphorus compounds comprises employing, in an initial reaction mixture, less than an equimolar quantity of trivalent phosphorus ester with respect to the phosphorus halide and aldehyde, the polyphosphorus compounds can also be prepared by starting with a previously prepared 1:1:1 reaction product and adding the phosphorus halide and the carbonyl compound thereto. Thus, from a 1:1:1 mixture of a phosphorus halogen compound such as bis(2-chloroethyl) phosphorochloridite, an aldehyde such as propionaldehyde and a trivalent phosphorus ester such as triethyl phosphite there is obtained, according to the process of my copending application, Serial No. 780,209, filed December 15, 1958, the bis(2-chloroethyl) phosphite of diethyl 1-hydroxy-propylphosphonate:

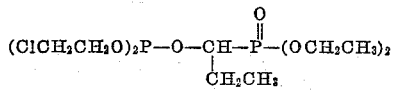

This compound can then be converted to one having a plurality of pentavalent phosphorus radicals by reacting it with additional quantities of the bis(2-chloroethyl) phosphorochloridite and of the propionaldehyde to give the phosphite-polyphosphonate

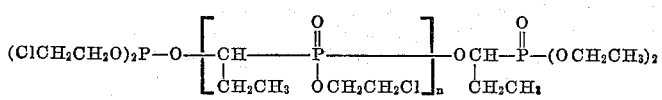

where $n$ is a number of at least 1. Or, instead of using the same trivalent phosphorus halide and the same aldehyde which was used for preparing the bis(2-chloroethyl) phosphite of diethyl 1-hydroxy-propylphosphonate, there may be used a different trivalent phosphorus halide and a different aldehyde, e.g., 2-chloroethyl ethyl phosphonochloridite and a different aldehyde, e.g., benzaldehyde. In this case the reaction proceeds as follows:

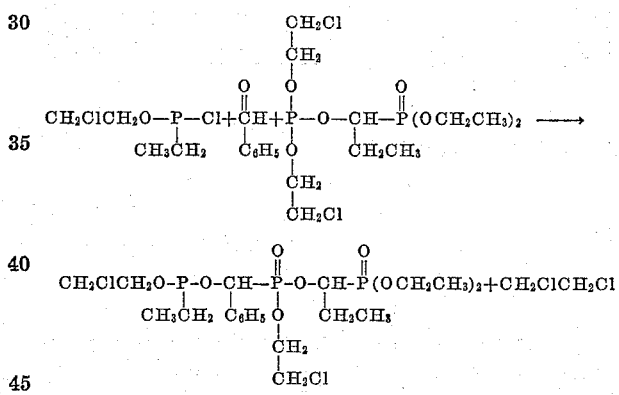

It is thus apparent that in the repeating units

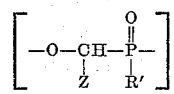

the substituents Z and R' need not be the same radical in all of the units of the polyphosphorus ester. Thus there are obtainable a great diversity of compounds having a single trivalent phosphorus radical and one or more pentavalent phosphorus radicals which, according to this invention are isomerized upon heat-treatment to give compounds in which phosphorus is present only in the pentavalent form.

Depending upon the molar ratio of the halidite, the aldehyde and the ester $R'_2POT$, the products obtained from mixtures of the three have the general formula:

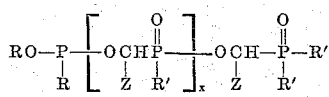

where $x$ is zero when equimolar quantities of the three reactants are employed and is at least one when the proportion of said ester is less than equimolar with respect to each of the other two reactants. Depending upon the ratio of the three reactants, the average value of $x$ may obviously be a number of between zero and one, i.e., the reaction mixture can consist of the 1:1:1 halidite-aldehyde-ester product in a mixture with products wherein $x$ is one or more. The trivalent phosphorus ester portion of either said 1:1:1 products or of the polyphosphorus compounds isomerizes upon heating at, say 135-225° C., the general formula for the presently provided pentavalent phosphorus ester products being:

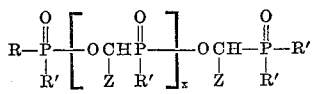

where $x$ denotes the average number of bracketed units, which number may be zero or more.

As hereinbefore stated, the reaction products which are obtained from equimolar mixtures of the three reactants and those obtained from one mole of the halidite, one mole of the aldehyde and less than one mole of the ester isomerize when heated at 135-225° C. according to the invention to give products wherein the phosphorus is present in only the pentavalent form, thus:

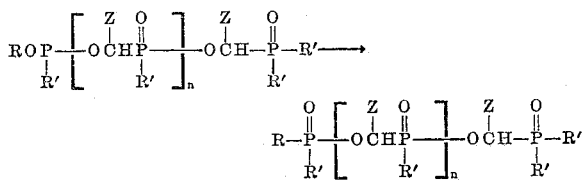

For example, the product obtained from one mole of bis-(2-chloropropyl) phosphorochloridite, one mole of formaldehyde and less than one mole of triethyl phosphite is converted upon heating at 135-225° C. to the polyphosphonate, thus:

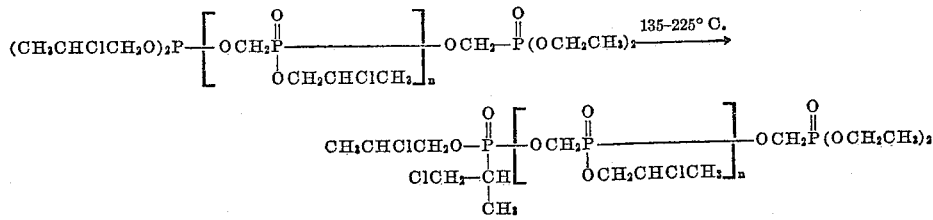

Use of less than an equimolar quantity of a phosphonite or a phosphinite with respect to the halidite and the aldehyde gives polyphosphorus compounds which upon heating at 135-225° C. rearrange to give, e.g., the following from the phosphonite:

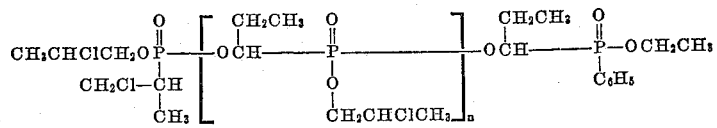

and the following from the phosphinite:

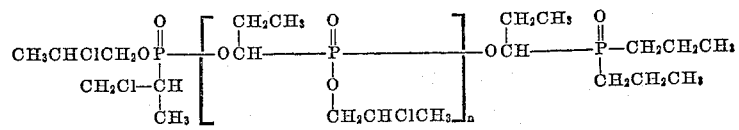

It will be noted from the following instances, wherein there are shown isomerization of either the 1:1:1 phosphorus halide-aldehyde-ester products or of the polyphosphorus esters that only the trivalent phosphorus portion of either type of ester is involved.

Compounds obtained from a phosphonochloridite, an aldehyde and a phosphite undergo similar isomerization. For example, the 1:1:1 reaction product of 2-chloropropyl ethylphosphonochloridite, benzaldehyde and an alkyl diphenyl phosphite gives the phosphinate-phosphonate as follows:

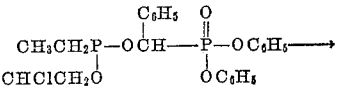

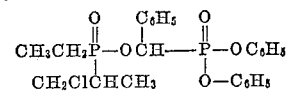

That obtained from less than an equimolar proportion of the phosphite reacts as follows:

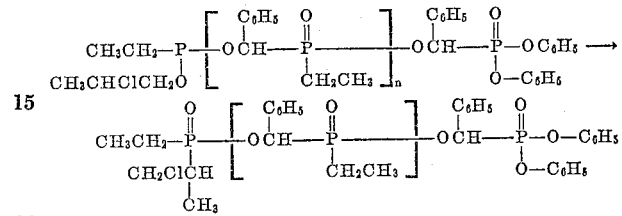

Also, the reaction product of one mole of 2-chloroethyl phenylphosphonochloridite, one mole of acetaldehyde and one mole of diethyl n-propylphosphonite is converted by heating to the disphosphinate:

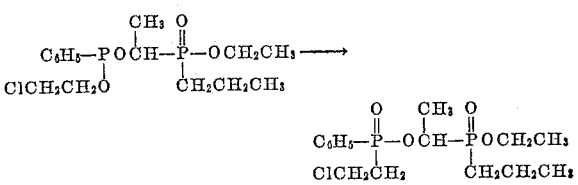

Similar isomerization is evidenced by the product prepared from the same reactants in a proportion wherein the phosphonite is present in less than equimolar ratio with respect to the other two reactants, thus:

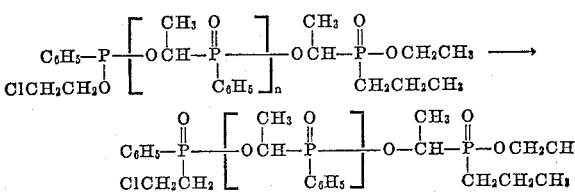

When a phosphinite, say ethyl ditolylphosphinite is used as the trivalent ester with the same phosphonochloridite, the heat isomerization products have the formula

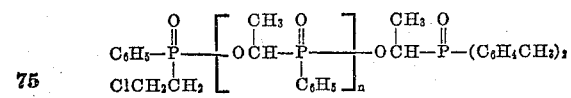

The presently provided pentavalent phosphorus di- or polyesters are classes of compounds having the following structures wherein R is selected from the class consisting of haloalkyl, haloalkenyl, alkoxyhaloalkyl, and aryloxyhaloalkyl radicals of from 1 to 12 carbon atoms, Y is a hydrocarbyl radical of from 1 to 12 carbon atoms, YX is an aromatic halohydrocarbyl radical of from 6 to 12 carbon atoms, Z is selected from the class consisting of hydrogen, hydrocarbyl, halohydrocarbyl, cyanohydrocarbyl, carboalkoxyhydrocarbyl, alkoxyhydrocarbyl and alkylthiohydrocarbyl radicals of from 1 to 17 carbon atoms and the thienyl and furyl radicals, and $n$ is a number of at least one:

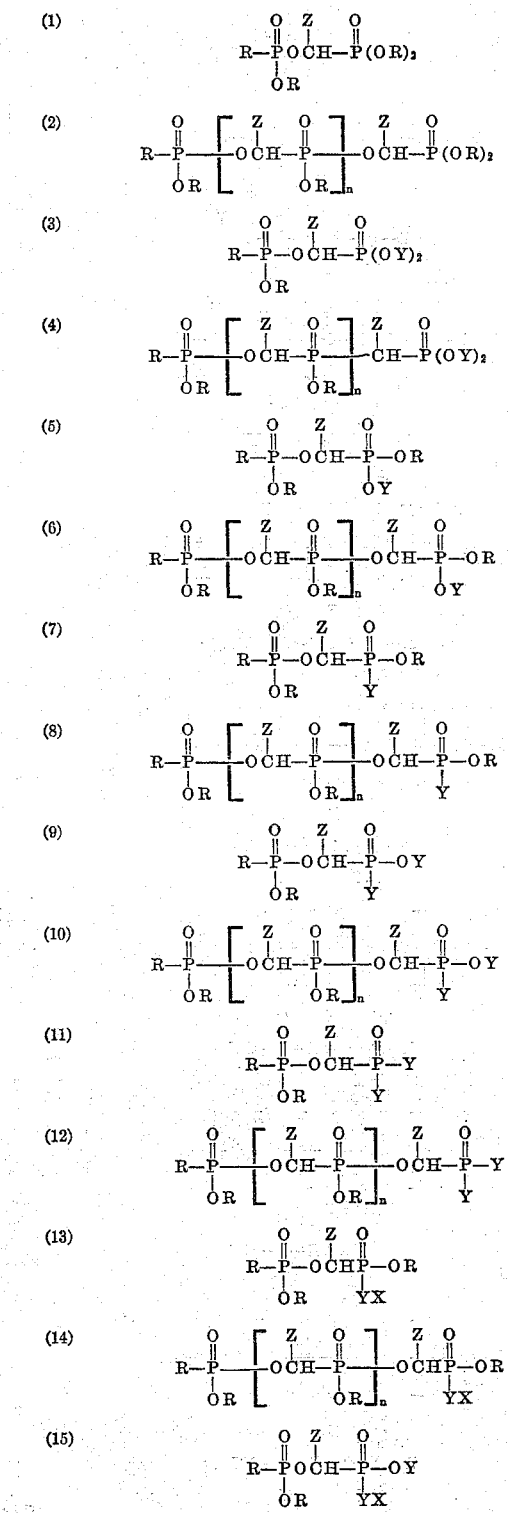

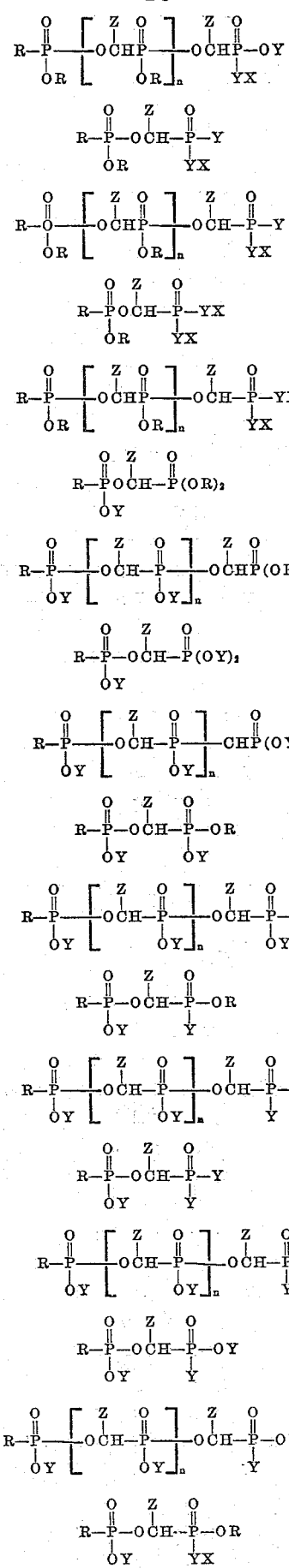

(34) $$R-\underset{OY}{\overset{O}{P}}-\left[O\underset{OY}{\overset{Z}{C}H}-\overset{O}{P}\right]_n O\overset{Z}{C}H-\underset{YX}{\overset{O}{P}}-OR$$

(35) $$R-\underset{OY}{\overset{O}{P}}-O\overset{Z}{C}H-\underset{YX}{\overset{O}{P}}-OY$$

(36) $$R-\underset{OY}{\overset{O}{P}}-\left[O\overset{Z}{C}H-\underset{OY}{\overset{O}{P}}\right]_n O\overset{Z}{C}H-\underset{YX}{\overset{O}{P}}-OY$$

(37) $$R-\underset{OY}{\overset{O}{P}}-O\overset{Z}{C}H-\underset{YX}{\overset{O}{P}}-Y$$

(38) $$R-\underset{OY}{\overset{O}{P}}-\left[O\overset{Z}{C}H-\underset{OY}{\overset{O}{P}}\right]_n O\overset{Z}{C}H-\underset{YX}{\overset{O}{P}}-Y$$

(39) $$R-\underset{OY}{\overset{O}{P}}-O\overset{Z}{C}H-\underset{YX}{\overset{O}{P}}-YX$$

(40) $$R-\underset{OY}{\overset{O}{P}}-\left[O\overset{Z}{C}H-\underset{OY}{\overset{O}{P}}\right]_n O\overset{Z}{C}H-\underset{YX}{\overset{O}{P}}-YX$$

(41) $$R-\underset{Y}{\overset{O}{P}}-O\overset{Z}{C}H-\overset{O}{P}(OR)_2$$

(42) $$R-\underset{Y}{\overset{O}{P}}-\left[O\overset{Z}{C}H-\underset{Y}{\overset{O}{P}}\right]_n O\overset{Z}{C}H-\overset{O}{P}(OR)_2$$

(43) $$R-\underset{Y}{\overset{O}{P}}O\overset{Z}{C}H-\underset{OY}{\overset{O}{P}}-OR$$

(44) $$R-\underset{Y}{\overset{O}{P}}-\left[O\overset{Z}{C}H-\underset{Y}{\overset{O}{P}}\right]_n O\overset{Z}{C}H-\underset{OY}{\overset{O}{P}}-OR$$

(45) $$R-\underset{Y}{\overset{O}{P}}-O\overset{Z}{C}H-\overset{O}{P}(OY)_2$$

(46) $$R-\underset{Y}{\overset{O}{P}}-\left[O\overset{Z}{C}H-\underset{Y}{\overset{O}{P}}\right]_n O\overset{Z}{C}H-\overset{O}{P}(OY)_2$$

(47) $$R-\underset{Y}{\overset{O}{P}}-O\overset{Z}{C}H-\underset{Y}{\overset{O}{P}}-OR$$

(48) $$R-\underset{Y}{\overset{O}{P}}-\left[O\overset{Z}{C}H-\underset{Y}{\overset{O}{P}}\right]_n O\overset{Z}{C}HP-OR$$

(49) $$R-\underset{Y}{\overset{O}{P}}O\overset{Z}{C}H-\underset{Y}{\overset{O}{P}}-OY$$

(50) $$R-\underset{Y}{\overset{O}{P}}-\left[O\overset{Z}{C}H-\underset{Y}{\overset{O}{P}}\right]_n O\overset{Z}{C}HP-OY$$

(51) $$R-\underset{Y}{\overset{O}{P}}-O\overset{Z}{C}H-\underset{Y}{\overset{O}{P}}-Y$$

(52) $$R-\underset{Y}{\overset{O}{P}}-\left[O\overset{Z}{C}H-\underset{Y}{\overset{O}{P}}\right]_n O\overset{Z}{C}H-\underset{Y}{\overset{O}{P}}-Y$$

(53) $$R-\underset{Y}{\overset{O}{P}}-O\overset{Z}{C}H-\underset{YX}{\overset{O}{P}}-OR$$

(54) $$R-\underset{Y}{\overset{O}{P}}-\left[O\overset{Z}{C}H-\underset{Y}{\overset{O}{P}}\right]_n O\overset{Z}{C}H-\underset{YX}{\overset{O}{P}}-OR$$

(55) $$R-\underset{Y}{\overset{O}{P}}-O\overset{Z}{C}H-\underset{YX}{\overset{O}{P}}-OY$$

(56) $$R-\underset{Y}{\overset{O}{P}}-\left[O\overset{Z}{C}H-\underset{Y}{\overset{O}{P}}\right]_n O\overset{Z}{C}H-\underset{YX}{\overset{O}{P}}-OY$$

(57) $$R-\underset{Y}{\overset{O}{P}}-O\overset{Z}{C}H-\underset{YX}{\overset{O}{P}}-Y$$

(58) $$R-\underset{Y}{\overset{O}{P}}-\left[O\overset{Z}{C}H-\underset{Y}{\overset{O}{P}}\right]_n O\overset{Z}{C}H-\underset{YX}{\overset{O}{P}}-Y$$

(59) $$R-\underset{Y}{\overset{O}{P}}-O\overset{Z}{C}H-\underset{YX}{\overset{O}{P}}-YX$$

(60) $$R-\underset{Y}{\overset{O}{P}}-\left[O\overset{Z}{C}H-\underset{Y}{\overset{O}{P}}\right]_n O\overset{Z}{C}H-\underset{YX}{\overset{O}{P}}-YX$$

(61) $$R-\underset{YX}{\overset{O}{P}}-O\overset{Z}{C}H-\overset{O}{P}(OR)_2$$

(62) $$R-\underset{YX}{\overset{O}{P}}-\left[O\overset{Z}{C}HP-\underset{YX}{\phantom{O}}\right]_n O\overset{Z}{C}H-\overset{O}{P}-(OR)_2$$

(63) $$R-\underset{YX}{\overset{O}{P}}-O\overset{Z}{C}H-\overset{O}{P}(OY)_2$$

(64) $$R-\underset{YX}{\overset{O}{P}}-\left[O\overset{Z}{C}H-\underset{YX}{\overset{O}{P}}\right]_n O\overset{Z}{C}H-\overset{O}{P}(OY)_2$$

(65) $$R-\underset{YX}{\overset{O}{P}}-O\overset{Z}{C}H-\underset{OR}{\overset{O}{P}}-OY$$

(66) $$R-\underset{YX}{\overset{O}{P}}-\left[O\overset{Z}{C}H-\underset{YX}{\overset{O}{P}}\right]_n O\overset{Z}{C}H-\underset{OR}{\overset{O}{P}}-OY$$

(67) $$R-\underset{YX}{\overset{O}{P}}-O\overset{Z}{C}H-\underset{Y}{\overset{O}{P}}-OR$$

(68) $$R-\underset{YX}{\overset{O}{P}}-\left[O\overset{Z}{C}H-\underset{YX}{\overset{O}{P}}\right]_n O\overset{Z}{C}H-\underset{Y}{\overset{O}{P}}-OR$$

(69) $$R-\underset{YX}{\overset{O}{P}}-O\overset{Z}{C}H-\underset{Y}{\overset{O}{P}}-OY$$

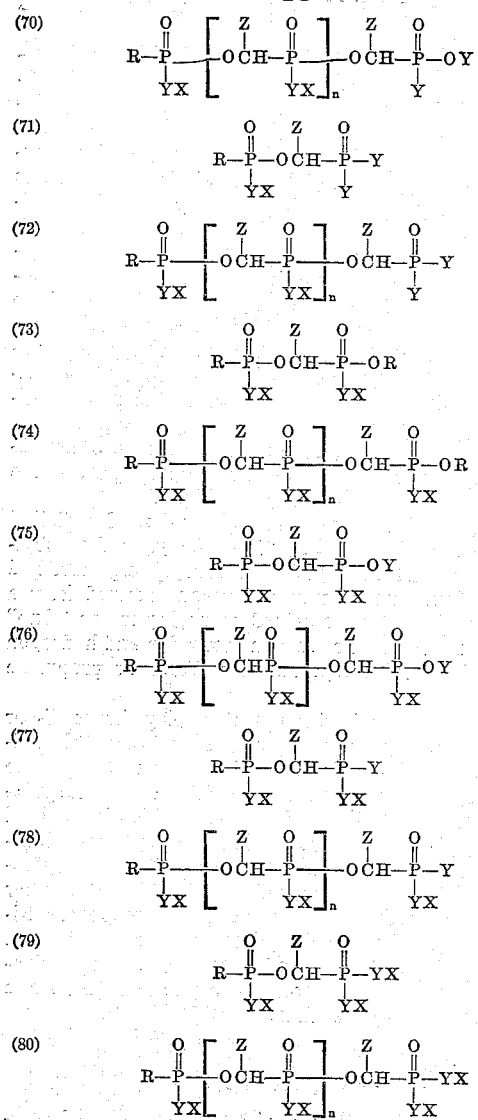

The above classes of compounds are all obtainable by heat isomerization of the reaction product of (1) a halidite of the formula $$ROPX \atop R'$$

wherein R is selected from the class consisting of haloalkyl, haloalkenyl, alkoxyhaloalkyl and aryloxyhaloalkyl radicals of from 1 to 12 carbon atoms, R' is selected from the class consisting of —OR and —O-hydrocarbyl, hydrocarbyl and halohydrocarbyl radicals of from 1 to 12 carbon atoms and X is selected from the class consisting of chlorine and bromine, (2) an aldehyde of the formula ZCHO where Z is selected from the class consisting of hydrocarbyl, halohydrocarbyl, cyanohydrocarbyl, carboalkoxyhydrocarbyl, alkoxyhydrocarbyl, and alkylthiohydrocarbyl radicals of from 1 to 17 carbon atoms and the thienyl and furyl radicals, and (3) a trivalent organic phosphorus ester of the formula $$TO-P-R' \atop R'$$

in which R' is as above defined and T is selected from the class consisting of alkyl and haloalkyl radicals of from 1 to 12 carbon atoms.

An important class of phosphorus halogen compounds of the above formula are the phosphorohalidites, i.e., compounds of the formula (RO)₂PX. This includes the haloalkyl phosphorohalidites, e.g., bis(2-chloroethyl), bis(2-bromo-3-chloropropyl), bis(3-bromo-2-chloropropyl), bis(2,3-dichloropropyl), bis(2-bromopropyl), bis(tetrachloropropyl), bis(dichloroamyl), bis(dichlorododecyl), 2-chloroethyl methyl, allyl 2-bromopropyl, dibromohexyl butenyl or 2-chloropropyl dodecyl phosphorochloridite or phosphorobromidite. Also useful are the haloalkenyl phosphorohalidites, e.g., bis(2-chloro-3-pentenyl) phosphorochloridite obtained by reaction of phosphorus trichloride with 4,5-epoxy-2-pentene.

The alkoxyhaloalkyl or aryloxyhaloalkyl phosphorochloridites obtained by reaction of glycidyl ethers with phosphorus trichloride or phosphorus tribromide are likewise very useful phosphorus-halogen reactants, as will be hereinafter disclosed.

Also useful in the reaction with aldehydes and triorgano phosphites to give the present polyphosphorus compounds are the haloalkyl, haloalkenyl, alkoxyhaloalkyl or aryloxyhaloalkyl esters of hydrocarbyl- or halohydrocarbylphosphonohalidites, i.e., compounds of the formula $$RO-P-X \atop Y$$

wherein R is as above defined and Y denotes a hydrocarbyl or halohydrocarbyl radical of from 1 to 12 carbon atoms.

Presently useful hydrocarbylphosphonohalidites or halohydrophosphonohalidites, include, e.g., 2-chloropropyl phenylphosphonochloridite, 2-bromobutenyl α-naphthylphosphonochloridite, 2-chloroethyl 2-fluoroethylphosphonochloridite, 2-bromoethyl methylphosphonobromidite, trichlorobutyl benzylphosphonochloridite, 2-chloropropyl p-tolylphosphonobromidite, 2-bromoethyl n-butyl phosphonochloridite, 2-bromo-4-ethoxybutyl p-biphenylphosphonochloridite, 2-chlorethyl phenylphosphonochloridite, 2-bromo-3-hexenyl phenylphosphonochloridite, tetrachloropentyl ethylphosphonochloridite, 3-bromopropyl n-hexylphosphonochloridite, 2-bromopropyl β-bromo-α-naphthylphosphonobromidite, dibromododecyl methylphosphonobromidite, 2-bromoethyl benzylphosphonochloridite, trichlorooctyl cyclohexylphosphonochloridite, 4-bromobutyl α-napthylphosphonochloridite, 2-chloroethyl 3-butenylphosphonochloridite, 2-chloropropyl 2-hexenylphosphonochloridite, 2-chloro-4-ethoxybutyl n-butylphosphonochloridite, etc.

Any of the above described trivalent phosphorus halogen compounds can be reacted with an aldehyde and a triorgano phosphite to give esters containing both trivalent and pentavalent phosphorus which upon heating at, say, 135°–225° C. give the presently provided esters which contain phosphorus only in the pentavalent form. The useful aldehydes have the formula ZCHO wherein Z is selected from the class consisting of hydrogen and hydrocarbyl, halohydrocarbyl, carboalkoxyhydrocarbyl, alkylthiohydrocarbyl, alkoxyhydrocarbyl and cyanohydrocarbyl radicals of from 1 to 12 carbon atoms, and the thienyl and furyl radicals.

Owing to their easy availability, a particularly useful class of aldehydes includes the aliphatic hydrocarbon aldehydes of from 1 to 18 carbon atoms, e.g., formaldehyde, acetaldehyde, acrolein, propionaldehyde, butyraldehyde, isobutyraldehyde, crotonaldehyde, valeraldehyde, isovaleraldehyde, hexanal, citronellol, heptanal, tiglic aldehyde, 2-ethylhexanal, octanal, 2-butyloctanal, propargaldehyde, 6-methylheptanal, amylpropiolic aldehyde, decanal, undecanal, 2-methylundecanal, lauraldehyde, stearaldehyde, tridecaldehyde, etc.

The presence of cyano, halogen, alkyl, carboalkoxy, alkoxy and alkylthio- substituents in the aliphatic aldehyde has no effect on the course of the reaction; hence, there may be employed such substituted fatty aldehydes as 3-cyanopropionaldehyde, chloroacetaldehyde, 3-butoxybutyraldehyde, 4-cyano-2,2-dimethylbutyraldehyde, 2,3- dichloropropionaldehyde, chloral, 3-isopropoxypropionaldehyde, 3-(ethylthio)-3-methylbutyraldehyde, 2-methyl-3-fluoropropionaldehyde, dibromostearaldehyde, dichlorolauraldehyde, ethyl 11-formylundecanoate, succinaldehydic acid methyl ester, ethyl 4-formylbutyrate, diethyl formylsuccinate, iodoacetaldehyde, dichloroacetaldehyde, etc.

Presently useful alicyclic carboxaldehydes include cyclohexanecarboxaldehyde, 6 - methyl-3-cyclohexenecarboxaldehyde, 2-cyclohexene-1-carboxaldehyde, cyclopentanecarboxaldehyde, 3 - isopropyl-1-methylcyclohexanecarboxaldehyde, 5 - ethoxy - 3-cyclopentene-1-carboxaldehyde, 1 - bromo - 2,2,6 - trimethylcyclohexanecarboxaldehyde, 2,2,6-trimethylcyclohexanecarboxaldehyde, 2,2,6-trimethyl - 2 - cyclohexenecarboxaldehyde, 4 - chloro-cyclohexanecarboxaldehyde, etc. The heterocyclic aldehydes include furfural and the thiophenecarboxaldehydes.

The presently useful benzenoid aldehydes may be aliphatic-aromatic or purely aromatic aldehydes which may or may not be further substituted, e.g., benzaldehyde, o-, m- or p-tolualdehyde, phenylacetaldehyde, dipentylbenzaldehyde, cinnamaldehyde, 1- or 2-napthaldehyde, biphenyl-4-carboxaldehyde, α-phenylacrolein, hydrocinnamaldehyde, 2,3-dichlorobenzaldehyde, phenylpropargaldehyde, 2-, 3- or 4-butoxybenzaldehyde, o-, m- or p-chlorobenzaldehyde, p-(ethoxy)benzaldehyde, 2-ethoxybenzaldehyde, 3,4-dipropoxybenzaldehyde, 4-(n-butylthio)benzaldehyde, o-, m- or p-iodobenzaldehyde, 3,4- or 3,5-dibromobenzaldehyde, 5-tert-butyl-m-tolualdehyde, 5-tert-butyl-3-fluoro-o-tolualdehyde, 2-p-cymenecarboxaldehyde, 6-methoxy-2-naphthaldehyde, 2-butoxy-1-naphthaldehyde, 4'-bromo-4-biphenylcarboxaldehyde, etc.

Triorgano phosphites which are generally useful with the aldehyde and the phosphorus halide to give the presently useful esters are either simple or mixed phosphites. Examples of useful phosphites are trimethyl, triethyl, triallyl, triisopropyl, tri-n-propyl, tri-2-butenyl, tri-n-butyl, tri-tert-amyl, tri-n-hexyl, tri-n-heptyl, tris(2-ethylhexyl), trioctenyl, tri-n-octyl, trinonyl, tridecyl, triundecyl, tri-tert-dodecyl, tridodecyl, amyl diethyl, butyl di-n-propyl, n-dodecyl dimethyl, ethyl octyl propyl, tris(2-chloroethyl), tris(3-chloropropyl), tris(2-chloropropyl), tris(3,4-dichlorobutyl), tris(2-chloro-4-pentenyl), tris(2-bromoethyl), tris(3-chloro-2-propenyl), tris(3-iodopropyl), tris(2 - fluoroethyl), tris(dichlorododecyl), tris(2-ethoxyethyl), 2-chloroethyl diethyl, tris(2-phenoxypropyl), 3-bromopropyl bis(2-chloroethyl), diamyl trichlorooctyl, 2-chloroethyl 3-chloropropyl 4-chlorobutyl, 2-chloroethyl methyl propyl, tris(2,3-dichloropropyl), tris-(2-bromo-3-chloropropyl), tris(2 - chloro-3-methoxypropyl) and tris(2-bromo-4-phenoxybutyl) phosphite.

Instead of the tribasic phosphites there may be employed as the trivalent phosphorus ester component a diester of a hydrocarbyl or halohydrocarbylphosphonite, i.e., a compound of the formula YP(OR)₂ where Y is selected from the class consisting of hydrocarbyl and halohydrocarbyl radicals of from 1 to 12 carbon atoms.

Presently useful phosphonites include, e.g., dimethyl phenylphosphonite, diethyl 2-propinylphosphonite, ethyl methyl phenylphosphonite, di-n-propyl methylphosphonite, di-n-butyl benzylphosphonite, bis(2-chloroethyl) p-tolylphosphonite, bis(2-methoxyethyl) cyclohexylphosphonite, bis(2-ethylhexyl) 2,4-diethylphenylphosphonite, bis(2-bromo-3-ethoxypropyl) 2-bromo-ethylphosphonite, diethyl 2-propinylphosphonite, bis(2-butyloctyl) 2-butenylphosphonite, di-n-hexyl p-biphenylphosphonite, diundecyl n-hexylphosphonite, bis(trichloropropyl) 2-methylcyclopentylphosphonite, diethyl 4-n-hexylphenylphosphonite, diallyl 2-phenylethylphosphonite, dipentenyl 2-ethylhexylphosphonite, bis(2-chloroethyl) phenylphosphonite, bis(tetrachloropentyl) ethylphosphonite, bis(3-bromopropyl) biphenylylphosphonite, bis(2-chloro-4-phenoxybutyl) methylphosphonite, bis(2-chloroethyl) benzylphosphonite, bis(2-bromo-3-chloropropyl) phenylphospho-nite, allyl propyl 2,4-dichlorophenylphosphonite, bis-(trichlorooctyl) cyclohexylphosphonite, bis(4 - fluorobutyl) 2-cyclohexenylphosphonite, bis(4-chlorobutyl) ethylphosphonite, bis(dichlorohexyl) phenylphosphonite, bis(2-chloropropyl) n-butylphosphonite, di-n-butyl pentachlorophenylphosphonite, etc.

Presently useful as the ester component are also phosphinites of the formula Y₂POR wherein Y and R are as herein defined, e.g., the alkyl or alkenyl dihydrocarbylphosphinites such as ethyl, allyl, butyl, n-octyl diethylphosphinite, benzylcyclohexylphosphinite or diphenylphosphinite, benzylcyclohexylphosphinite or diallylphosphinite; the corresponding haloalkyl esters such as 2-chloropropyl di-p-tolylphosphinite or 2-fluorethyl ethylmethylphosphinite; the ether-substituted esters such as 4-methoxybutyl or 3-phenoxy-2-chloropropyl di-n-butylphosphinite or di-β-naphthylphosphinite; and the corresponding esters of the halo-substituted phosphinic acids such as the methyl, pently, ethyl, 2-butenyl, 2-chloroethyl, 3-ethoxypropyl, or 4-butoxy-2-bromopentyl esters of bis(2-chloropropyl) phosphinite or of n-butyl(4-chlorophenyl) phosphinite.

The alkyl radical of a trialkyl phosphite, of a dialkyl halohydrocarbylphosphonite, of a dialkyl hydrocarbylphosphonite, or of an alkyl dihydrocarbylphosphinite and halo derivatives thereof may also be one derived from a branched chain alcohol obtained according to the "Oxo" process by the reaction of carbon monoxide and hydrogen with a higher olefin, e.g., butylene dimer or propylene trimer.

The presently provided pentavalent phosphorus di- or polyesters are very conveniently prepared from the trivalent phosphorus-pentavalent phosphorus esters that are prepared by mixing together an aldehyde and the mixture of phosphorohalidite and phosphite which is obtained by reacting phosphorus trichloride or phosphorus tribromide with an oxirane compound. As disclosed in my co-pending application, Serial No. 780,262, filed December 15, 1958, the reaction of two moles of phosphorus trichloride or phosphorus tribromide with five moles of an olefin oxide, e.g., ethylene oxide, results in the production of an equimolar mixture of a phosphorochloridite and a tribasic phosphite, thus:

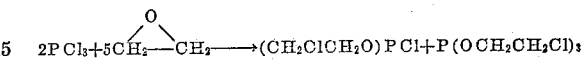

However, when there is used with the two moles of phosphorus trichloride a quantity of alkylene oxide which is less than five moles, but greater than four moles, the reaction product contains less of tribasic phosphite than of phosphorochloridite. For example, using 2 moles of phosphorus trihalide and 4.98 moles of alkylene oxide, the reaction product consists essentially of 0.98 mole of tribasic phosphite and 1.02 moles of phosphorohalidite. Using 2 moles of phosphorus trihalide and 4.95 moles of alkylene oxide, the reaction product consists of about 0.95 mole of phosphite and 1.05 moles of the halidite. As the number of moles of the alkylene oxide per 2 moles of phosphorus trichloride approaches 4, there is an increasingly greater content of phosphorohalidite in the reaction product. The variation of halidite to ester ratio in the reaction product of an alkylene oxide and phosphorus trihalide is shown below.

| Moles of alkylene oxide per 2 moles of PCl₃ or PBr₃ | Moles of halidite in product per mole of phosphite |
| --- | --- |
| 4.80 | 1.5 |
| 4.67 | 2.0 |
| 4.50 | 3.0 |
| 4.40 | 4.0 |
| 4.33 | 5.0 |
| 4.29 | 6.0 |
| 4.25 | 7.0 |
| 4.17 | 11.0 |
| 4.09 | 21.0 |

The average number of units

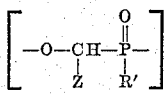

in the polyphosphorus compounds obtained by reacting the phosphite-halidite mixture with an aldehyde in a quantity which is at least equimolar with respect to the halidite increases with increasing halidite ratio. When the phosphite to halidite ratio is 0.98:1.02 the reaction product consists of about 96% on a molar basis of the 1:1:1 halidite-aldehyde-ester compound (which has none such unit) and about 4% on a molar basis of a compound having one such unit. When the phosphite to halidite ratio is 0.95:1.05, the reaction product consists of about 89.5% on a molar basis of a compound having none such units and about 10.5% on a molar basis of a compound having one such unit. As the halidite content of the phosphorus trichloride-alkylene oxide reaction product increases, the number of said units in the product obtained therefrom by reaction with an aldehyde increases, as is apparent from the table below:

| Molar ratio of halidite to phosphite | Average number of repeating units in aldehyde product |
| --- | --- |
| 1.02:0.98 | 0.04 |
| 1.05:0.95 | 0.1 |
| 1.5:1 | 0.5 |
| 2:1 | 1.0 |
| 3:1 | 2.0 |
| 4:1 | 3.0 |
| 5:1 | 4.0 |
| 6:1 | 5.0 |
| 7:1 | 6.0 |
| 11:1 | 10.0 |
| 21:1 | 20.0 |

It will thus be noted that as the halidite content of the phosphorus trichloride-alkylene oxide reaction mixture increases, the number of said units in the polyphosphorus compounds appears to increase asymptotically. Thus from a 1:101 phosphite-halidite mixture, the calculated average number of said units in the polyphosphorus compound is 100. For practical purposes and in order to obtain products of value for presently desired industrial applications, it is preferred to operate in such a manner that the average number of said units is, say, from 1 to 10, and more advantageously from 1 to 4.

As will be apparent to those skilled in the art the term "average units" when applied to repetitive portions of a high molecular weight composition indicates a mixture in which there is present varying numbers of such units. Hence in a composition which is stated to have, say, an average of 10 repeating units there will be present compounds having less than 10 such units as well as compounds having more than 10 units.

It is thus apparent that so long as there is employed in the reaction with the aldehyde a mixture of phosphorohalidite and tribasic phosphite which is prepared by reaction of two moles of phosphorus trihalide with more than four but less than five moles of alkylene oxide, and the quantity of aldehyde used is at least equimolar with respect to the phosphorohalidite content of the so obtained trihalide-alkylene oxide reaction product, there is present in the final reaction product a substantial quantity of phosphite-polyphosphonate.

Oxirane compounds suitable for reaction with the phosphorus trichloride or phosphorus tribromide to yield mixtures of phosphite and phosphorochloridite that are reacted with an aldehyde to give the compounds which are presently isomerized are, e.g., ethylene oxide and alkyl derivatives thereof such as propylene oxide, isobutylene oxide, 1,2-epoxybutane, 2,3-epoxybutane, 1,2-epoxypentane, 2,3-epoxypentane, 2,3-epoxyhexane, 1,2-epoxyhexane, 1,2-epoxyheptane, 2,3-epoxy-3-ethylpentane, 1,2-epoxy-4-methylpentane, 1,2-epoxy-2-ethylhexane, 1,2-epoxy-2,4,4-trimethylpentane, 1,2-epoxy-2,3-dimethylheptane; haloalkyl-substituted oxiranes such as epichlorohydrin, epibromohydrin, epiiodohydrin, epifluorohydrin, 1,2-epoxy-4-bromobutane, 2,3-epoxy-4-chlorobutane, 1,2-epoxy-3,4-dibromobutane, 2,3-epoxy-1-bromopentane, 3,4-epoxy-2-chlorohexane, 1,2-epoxy-3,3,3-trifluoropropane, 1-bromo-2,3-epoxyheptane; the alkenyl-substituted oxiranes such as 3,4-epoxy-4-methyl-1-pentane and 3,4-epoxy-1-butene; aryl-substituted oxiranes such as (epoxyethyl)-benzene, (1,2-epoxy-1-methylethyl)benzene, (3-chloro-1,2-epoxypropyl)benzene; alkoxyalkyl- and phenoxyalkyl-substituted oxiranes such as the methyl, ethyl, isopropyl, isoamyl and phenyl ethers of glycidol, i.e., compounds of the formula

where R is methyl, ethyl, isopropyl, amyl or phenyl; (2-ethoxyethyl)ethylene oxide, etc.

Reaction of two moles of phosphorus trichloride or of phosphorus tribromide with five moles or with more than four but less than five moles of the presently useful substituted oxiranes gives, by way of example, mixtures of the following phosphites and phosphorohalidites which are advantageously reacted with an aldehyde to give presently useful trivalent phosphorus-pentavalent phosphorus esters:

(I) Tris(2-chloroethyl) phosphite and bis(2-chloroethyl) phosphorochloridite
(II) Tris(2,3-dichloropropyl) phosphite and bis(2,3-dichloropropyl) phosphorochloridite
(III) Tris(2-chloropropyl) phosphite and bis(2-chloropropyl) phosphorochloridite
(IV) Tris(2-bromoethyl) phosphite and bis(2-bromoethyl) phosphorobromidite
(V) Tris(2-bromopropyl) phosphite and bis(2-bromopropyl) phosphorobromidite
(VI) Tris(2,3-dibromopropyl) phosphite and bis(2,3-dibromopropyl) phosphorobromidite
(VII) Tris(3-bromo-2-chloropropyl) phosphite and bis(3-bromo-2-chloropropyl) phosphorochloridite
(VIII) Tris(2-bromo-3-chloropropyl) phosphite and bis-(2-bromo-3-chloropropyl) phosphorobromidite
(IX) Tris(2-chlorobutyl) phosphite and bis(2-chlorobutyl) phosphorochloridite
(X) Tris(2-bromobutyl) phosphite and bis(2-bromobutyl) phosphorobromidite
(XI) Tris(2-chloro-1-methylpropyl) phosphite and bis-(2-chloro-1-methylpropyl) phosphorochloridite
(XII) Tris[(1-chloromethyl)butyl] phosphite and bis-[(1-chloromethyl)butyl] phosphorochloridite
(XIII) Tris[(1-bromomethyl)-tert-amyl] phosphite and bis[(1-bromomethyl)-tert-amyl] phosphorobromidite
(XIV) Tris[(α-chloromethyl)benzyl] phosphite and bis-[(α-chloromethyl)benzyl] phosphorochloridite
(XV) Tris(2-chloro-2-phenylethyl) phosphite and bis(2-chloro-2-phenylethyl) phosphorochloridite
(XVI) Tris(2-bromo-2-methyl-2-phenylethyl) phosphite and bis(2-bromo-2-methyl-2-phenylethyl) phosphorobromidite
(XVII) Tris(2-chloro-3-butenyl) phosphite and bis(2-chloro-3-butenyl) phosphorochloridite
(XVIII) Tris(2-chloro-2-ethylhexyl) phosphite and bis-(2-chloro-2-ethylhexyl) phosphorochloridite
(XIX) Tris(3-methoxy-2-chloropropyl) phosphite and bis(3-methoxy-2-chloropropyl) phosphorochloridite
(XX) Tris(3-phenoxy-2-bromopropyl) phosphite and bis-(3-phenoxy-2-bromopropyl) phosphorobromidite
(XXI) Tris(2-chloro-4-ethoxybutyl) phosphite and bis-(2-chloro-4-ethoxybutyl) phosphorochloridite
(XXII) Tris(3-bromo-2-chloropropyl) phosphite and bis-(3-bromo-2-chloropropyl) phosphorochloridite Since reaction of the oxirane compound with the phosphorus trihalide proceeds through opening of the oxirane ring, there may be present in the above mixtures minor amounts of isomeric phosphite and isomeric phosphorohalidite, e.g., while in the reaction of phosphorus trichloride and propylene oxide the oxirane ring opens with preferential formation of tris(2-chloropropyl) phosphite and bis(2-chloropropyl) phosphorochloridite there may also be formed small quantities of tris(1-methyl-2-chloroethyl) phosphite and bis(1-methyl-2-chloroethyl) phosphorochloridite. The isomer content, if any, of the reaction mixture is of no consequence for the present purpose because the isomers also react with the carbonyl compound to give phosphite-phosphonates. While the small quantity of isomeric phosphite-phosphonate present in the final reaction product may be considered to constitute an impurity, it is not detrimental in practical application for the isomers are so closely related that they possess substantially the same utility. Thus, the content of, say, a small quantity of the bis(1-methyl-2-chloroethyl) phosphite of bis(1-methyl-2-chloroethyl) (1-hydroxyethyl) phosphonate, which may be present along with the bis(2-chloropropyl) phosphite of bis(2-chloropropyl) (1-hydroxyethyl) phosphonate in the reaction product of acetaldehyde and the mixture of phosphite and phosphorochloridite obtained from two moles of phosphorus trichloride and more than four but less than five moles of propylene oxide, generally does not limit the utility of the latter. However, if desired, the isomeric impurity may be separated by generally known isolating procedures, i.e., chromatography, crystallization, etc.

Reaction of the phosphorus trichloride or phosphorus tribromide with the presently useful oxirane compounds takes place readily, generally, by simply mixing the phosphorus halide with the oxirane compound in the appropriate ratio. Depending on the nature of the individual reactants, heating may or may not be required. The use of catalytic amounts of an acidic agent, e.g., hydrogen chloride or a compound which produces hydrogen chloride under the reaction conditions, e.g., ethylene chlorohydrin, is advantageous. Usually the reaction is exothermic, whereby cooling in order to maintain smooth reaction is advantageous. It is recommended that in such exothermic reactions the temperature not be allowed to rise above, say, from 60° C. to 80° C. An inert diluent may or may not be employed. When no diluent is used and there has been employed two moles of the phosphorus halide with more than four but less than five moles of the oxirane compound, the product consists of the halogenated triorgano phosphite and more than a molar equivalent of the halogenated diorgano phosphorohalidite. Hence, no isolating procedure is required before reaction with the aldehyde for preparation of the presently provided phosphite polyphosphonates. Noting cessation of change in refractive index or of heat evolution in the case of exothermic reactions, or of change in viscosity of the reaction mass will suffice to determine when all of the initial reactants have been consumed.

When formaldehyde is employed with a mixture of a phosphorohalidite and phosphorus ester obtained from two moles of phosphorus trihalide and either five moles or more than four but less than five moles of an alkylene oxide, the trivalent phosphorus-pentavalent phosphorus esters have the formula

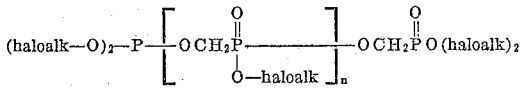

where haloalk denotes a haloalkyl radical of from 1 to 12 carbon atoms and $n$ is zero or greater. When the aldehyde is a fatty aldehyde, the products obtained from a mixture of phosphorohalidite like bis(2-chloropropyl)-phosphorochloridite and a phosphorus ester like tris(2-chloropropyl) phosphite have the formula:

in which alk denotes an alkyl radical of from 1 to 12 carbon atoms, and $n$ is zero or greater. When the same reaction product of propylene oxide and phosphorus trichloride is treated with an aromatic aldehyde and the products have the formula:

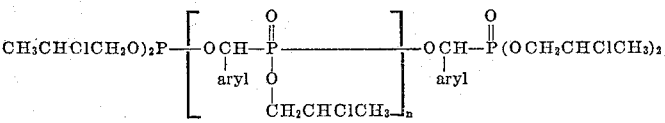

in which aryl denotes an aromatic hydrocarbon radical and $n$ is zero or greater.

Reaction of the trivalent phosphorus halogen compound, the aldehyde and the trivalent phosphorus ester in the above stated proportions takes place readily by contacting the three reactants at ordinary or moderately decreased or increased temperatures and allowing the resulting reaction mixture to stand until formation of the trivalent phosphorus-pentavalent phosphorus ester. Thus, the phosphorus halogen compound may be mixed with the phosphorus ester in the appropriate ratio or a mixture thereof may be prepared from a phosphorus trihalide and an oxirane compound as disclosed above, and the aldehyde may be added to the resulting mixture. Or, if desired, the aldehyde and the phosphorus ester may first be mixed and the phosphorus halogen compound added thereto. Because the reaction may be exothermic, gradual contact of the reactants is usually recommended in order to obtain smooth reaction. However, as will be apparent to those skilled in the art, the exothermal nature of the reaction becomes less of a factor as the molecular weight of the reactants, and particularly of the phosphorus-containing reactant is increased. Also, when the aldehyde is either a higher alkanecarboxaldehyde or an aralkyl or alkaryl aldehyde, reaction is generally not so rapid as it is with the lower aliphatic aldehydes or with benzaldehyde. It is thus recommended that in each initial run, the three reactants be mixed gradually at low temperatures and that external heating be employed only when there appears no spontaneous increase in temperature as a consequence of the mixing. In most instances, the reaction is mildly exothermic initially. Whether the reaction goes to completion without the use of extraneous heat is determined by the nature of the reactants. Completion of the reaction, in any event, can be readily ascertained by noting cessation in change of viscosity, refractive index, or the quantity of by-product halide. Using the lower alkanecarboxaldehydes, which aldehydes are generally very reactive, external cooling is usually advantageous. When working with such active aldehydes, optimum conditions comprise gradual addition of the aldehyde to the mixture of phosphite and phosphorus-halogen compound with application of external cooling and thorough stirring. Usually it suffices to maintain the reaction temperature at, say, from 10° C. to 50° C. during addition of the aldehyde. When all of the aldehyde has been added to said mixture and there is no longer any evidence of exothermic reaction, completion of the reaction may be assured by heating the reaction mixture to a temperature of from, say, 50° C. to 150° C., depending upon the nature of the reactants. With the more sluggish aldehydes, e.g., 2-phenylacetaldehyde or lauraldehyde, it may be necessary to heat the reaction mixture moderately, say, to a temperature of about 50° C. before an exothermic reaction is initiated. Employing naphthaldehyde as the aldehyde reactant and a high molecular weight phosphite and phosphorus-halogen compound, even higher temperatures may be required, e.g., temperatures of from 100° C. to 150° C. appear to give the best yields.

As stated above, formation of the desired product, i.e., the trivalent phosphorus-pentavalent phosphorus ester is accompanied by the formation of a halogenated alkane as a by-product. Thus, the reaction of, say, bis(2-chloropropyl) phosphorochloridite, acetaldehyde and triethyl phosphite gives ethyl chloride as a by-product:

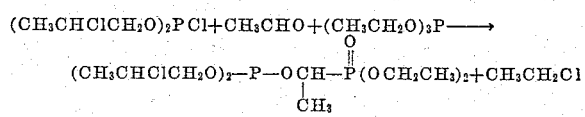

The by-product halide is readily removed from the desired product by volatilization. However, in many instances, the by-product halides are articles of commerce for which many applications exist. Thus, while many currently employed processes for the manufacture of organic compounds of phosphorus entail substantial waste of halogen in that by-products of little commercial importance are often formed, in the present instance when starting from the phosphorus trihalide-oxirane reaction products, all of the halogen constituent of the raw materials is converted into products of economic importance.

Reaction of the phosphorus halogen compound, the aldehyde and the trivalent phosphorus ester to give the presently useful trivalent phosphorus-pentavalent phosphorus esters is readily conducted in the presence or absence of inert diluents or solvents. The use of diluents may be particularly advantageous when working with the highly active aldehydes; such diluents may be, e.g., benzene, toluene, chloroform, methylene chloride or hexane.

When using substantially the stoichiometric proportion of reactants, the reaction product may be converted directly into product containing phosphorus only in the pentavalent form by heating it at a temperature of 135–225° C. The alkyl halide by-product obtained in the halidite-aldehyde-trivalent phosphorus reaction may or may not be removed previous to this heating step. Also, if preparation of the trivalent phosphorus-pentavalent phosphorus ester had been effected in the presence of a diluent, removal of the diluent previous to the heat isomerization reaction is optional.

As herein stated, conversion of the trivalent phosphorus reaction product into the totally pentavalent phosphorus ester proceeds according to the scheme:

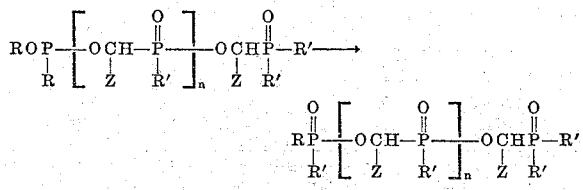

wherein $n$ is zero or greater.

In the case of the 1:1:1 bis(2-chloroethyl) phosphorochloridite-acetaldehyde-tris(2-chloroethyl) phosphite reaction product the isomerization takes place as follows:

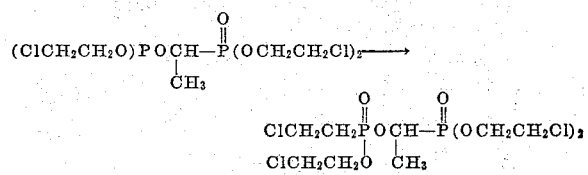

In some instances, particularly when working with reaction products obtained from the lower molecular weight reactants, there are formed in addition to the isomerization products, small amounts of products which may result from the intermolecular condensation of the haliditealdehyde-ester product. Thus, in the case of the bis(2-chloroethyl) phosphorochloridite - acetaldehyde - tris(2-chloroethyl) phosphite reaction product, heating at the isomerizing temperatures may result also in the following reaction:

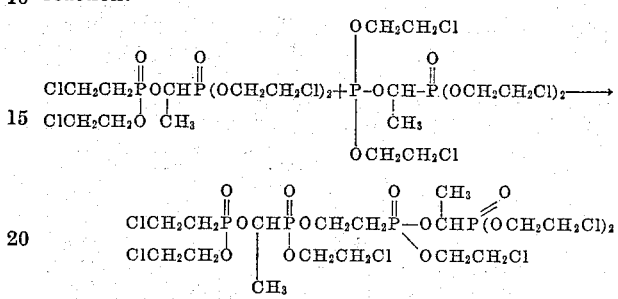

The self-condensation reaction takes place, generally, only to a limited extent. Its occurrence may be ascertained from the quantity of halide evolved during the heating step. Because, like the isomerization products, the condensation products will contain a plurality of phosphorus ester residues only in the pentavalent form, the presence thereof in these small quantities generally will not detract from the ultimate utility of the heat reaction product. However, the isomerization product may be separated from the self-condensation product, if desired, by known isolating procedures, e.g., by molecular sieve and chromatography procedures, etc.

As disclosed in my previously referred to patent applications, the halidite-aldehyde-trivalent phosphorus reaction products, e.g., compounds like the bis(haloalkyl) phosphites of α-hydroxyphosphonates obtained from a 1:1:1 molar ratio of the three reactants or the polyphosphorus compounds obtained when the ester is present in a quantity which is less than equimolar, are useful for a variety of agricultural and industrial purposes. The presently provided compounds are useful in substantially the same fields of application; however, being more stable to hydrolysis than are the starting materials, i.e., the trivalent phosphorus-pentavalent phosphorus esters, from which they are prepared, the presently provided exclusively pentavalent phosphorus esters will be preferred in some of these applications.

The presently provided products are generally high-boiling, stable materials which range from viscid liquids to waxy or crystalline solids. While the utility of the whole class of the present compounds will range somewhat with the nature of each of the three reactants, the presently provided isomerization products are generally useful as lubricant and gasoline additives, as biological and agricultural toxicants, as rubber compounding chemicals, and as adjuvants for synthetic resins and plastics. They are very valuable as flame-proofing agents for cellulosic and carbonaceous combustible materials generally.

In applications relating to synthetic resins and plastics, the present polyphosphorus esters are surprisingly useful in that not only do they impart flame-resistant characteristics thereto, but they also frequently demonstrate plasticizing and stabilizing. They are compatible over a wide concentration range with a great variety of resinous materials. They are advantageously employed in the preparation of improved synthetics such as the phenolic, polyester, polyamide, and cellulose ester resins, in the vinyl polymers such as polyvinyl chloride, the polyvinyl acetals, polystyrene, polyethylene, vinyl chloride-vinyl acetate copolymers, olefin-maleic anhydride copolymers, polybutadiene and the copolymer elastomers such as butadiene-styrene or butadiene acrylonitrile copolymers, etc. They are also very effectively used in the preparation of foamed resins, e.g., polystyrene foam or of polyester foams, such as polyethylene terephthalate, or the polyurethanes. Thus, use of the polyphosphorus compound with the required diisocyanate component and required hydroxy component in a quantity of, say, up to 40% or even 50% of the mix gives foamed products which not only are flame-proofed but which also have been compatibly plasticized.

Many of the presently provided products, particularly those that contain a plurality of the pentavalent phosphorus ester groups, are useful as functional fluids in electrical and force-transmitting applications. Being stable at high temperatures, substantially unaffected by moisture and either acidic or alkaline agents, and remaining liquid over a wide range of temperature conditions, they are generally useful in force-transmitting applications, e.g., as lubricants, as antifreeze compositions and as hydraulic fluids. They can be used alone for such purposes or mixed with other materials known in the art to be effective for these purposes, e.g., partially chlorinated biphenyls, alkylated polystyrenes, polyacrylates, etc. The present products are also useful as modifying agents for hydrocarbon oil lubricants, e.g., as lubricity improving agents.

Those of the presently prepared compounds which are gasoline-soluble are particularly useful as stable preignition additives for leaded gasolines. The invention thus provides an improved fuel for spark ignition internal combustion engines which consists essentially of gasoline, an organo lead anti-knock and the gasoline-soluble isomerization product, said product being present in said fuel in a quantity sufficient to suppress preignition of the fuel.

Preignition is the ignition of the combustible mixture of air and fuel prior to firing by the spark plug. This occurs when deposits of readily glowing material build up in the combustion chamber. When the fuel is a gasoline containing an organolead anti-knock together with a halohydrocarbon scavenger, such readily glowing deposits comprise carbon in a mixture with lead halides; the latter acting to reduce the normal ignition temperature of carbon. Since reduction of the ignition temperature tends to increase with increasing concentration of the organolead anti-knock, preignition is a problem which becomes particularly troublesome as use of high compression engines become more prevalent. The deposits of carbon and lead salt retain sufficient heat from the previous firing cycle in enough quantity to permit them to glow, and if the glowing period (which depends on ease of ignition, and hence the lead content of the deposit) is long enough, the fuel is fired in the next cycle before it can be fired by the spark plug. The erratic firing which thus results is demonstrated by a "wild ping" or a dull, thudding knock. It is generally accompanied by increased detonation, sparkplug fouling, and reduction of exhaust valve life.

It has now been found that preignition and the various difficulties consequent thereto can be substantially suppressed or entirely eliminated by incorporating the gasoline-soluble pentavalent di- or polyphosphorus compound into the leaded gasoline in a preignition-inhibiting quantity. Such a quantity, of course, will depend upon the content of organolead compound and halohydrocarbon scavenger in the fuel. Leaded gasolines usually contain an anti-knocking quantity of an organolead compound such as tetraethyllead, tetramethyllead, dimethyldiethyllead, and tetraphenyllead and substantially the amount of hydrocarbon halide scavenger, say, ethylene dibromide, ethylene dichloride, acetylene tetrabromide, or mono- or polyhalopropane, butane, or pentane, or polyhaloalkyl benzene, which is calculated to react with the organolead compound to give a lead halide, e.g., lead bromide when the organolead compound is tetraethyllead and the halohydrocarbon is ethylene dibromide. The quantity of the present compound which will suppress preignition of the leaded hydrocarbon fuel will depend upon the quantity of lead present in the fuel.

The invention is further illustrated by, but not limited to, the following examples.

*Example 1*

This example describes the production of a phosphite-diphosphonate by reaction of acetaldehyde with a mixture of phosphite and phosphorochloridite prepared from two moles of phosphorus trichloride and 4.67 moles of propylene oxide, and isomerization of the phosphite-diphosphonate to the triphosphonate.

The mixture of phosphite and phosphorochloridite was prepared as follows: A 2-liter flask was charged with 550 g. (4.0 moles) of phosphorus trichloride and 4.1 g. (0.05 mole) of ethylene chlorohydrin. It was immersed in a Dry Ice bath and 539 g. (9.28 moles) of propylene oxide was added thereto during 0.4 hour at a temperature of 10–15° C.

After removing a 6.0 g. sample of the resulting reaction mixture, the remaining reaction product, consisting of one mole of tris(2-chloropropyl) phosphite per two moles of bis(2-chloropropyl) phosphorochloridite was treated with 129 g. (2.94 moles) of acetaldehyde during 0.2 hour at a temperature of 15–30° C. When the heat of reaction had subsided (about 0.2 hour after addition of the aldehyde), the reaction mixture was warmed at 55–85° C. for 0.75 hour. A 5.0 g. analytical sample was removed and the remainder was concentrated to a pot temperature of 142° C./0.3 mm. to give 300.2 g. (99% theoretical yield) of propylene dichloride in a Dry Ice trap and as residue 901 g. (100% theoretical yield) of phosphite-diphosphonate, $n_D^{28}$ 1.4803, of the formula

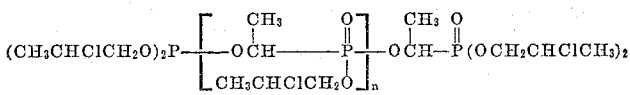

wherein $n$ has an average value of 1. Cryoscopic molecular weight determination of the product in benzene gave a value of 658 as compared to 680, the theoretical value. Nuclear magnetic resonance spectra for phosphorus showed characteristic chemical shifts at minus 141.6 p.p.m. (relative to $H_3PO_4$) for the trivalent phosphorus and at minus 21.5 p.p.m. for the pentavalent phosphorus. The product analyzed as follows:

|  | Found | Calcd. for $C_{19}H_{38}Cl_5O_9P_3$ |
|---|---|---|
| Percent C | 33.32 | 33.5 |
| Percent H | 5.47 | 5.6 |
| Percent Cl | 26.08 | 26.1 |
| Percent P | 13.68 | 13.7 |

A 300 g. sample of the above phosphite-diphosphonate was isomerized to the triphosphonate by heating at 190–200° C. for 0.5 hour. The reaction mixture was cooled to 140° C., and finally concentrated to 170° C./0.05 mm. to give 5.4 g. of by-product propylene dichloride in the Dry Ice trap and as residue 294.2 g. (98% theoretical yield) of the triphosphonate of the formula

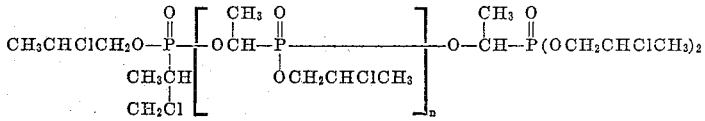

where $n$ has an average value of 1. Crysocopic molecular weight determination of the product in benzene gave a value of 713 as compared to 680, the theoretical value. Nuclear magnetic resonance spectra for phosphorus showed that it had been completely converted to the pentavalent state. It analyzed as follows:

|  | Found | Calcd. for $C_{19}H_{38}Cl_5O_9P_3$ |
|---|---|---|
| Percent C | 33.99 | 33.5 |
| Percent H | 5.72 | 5.6 |
| Percent Cl | 25.33 | 26.1 |
| Percent P | 14.01 | 13.7 |

*Example 2*

This example shows preparation of a phosphite-diphosphonate by reaction of a phosphorochloridite and an aldehyde with a previously prepared phosphite of a hydroxyalkylphosphonate, and isomerization of the phosphite-diphosphonate to the triphosphonate.

The bis(2-chloropropyl) phosphite of bis(2-chloropropyl) 1-hydroxyethylphosphonate was prepared by reaction of acetaldehyde with an equimolar mixture of bis(2-chloropropyl) phosphorochloridite and tris(2-chloropropyl) phosphite. To 248 g. (0.5 mole) of this compound there was first added 126.8 g. (0.5 mole) of bis(2-chloropropyl) phosphorochloridite and then there was introduced during a time of 0.2 hour, 26.4 g. (0.5 mole plus 20% excess) of acetaldehyde while maintaining the temperature of the reaction mixture at 25–35° C. by cooling. The whole was then warmed to 80–90° C. for 0.3 hour and then concentrated to 142° C./0.2 mm. to give 58.4 g. of distillate in the trap which formed a part of the reaction equipment (theory is 56.5 g. of by-product propylene dichloride plus 4.4 g. excess acetaldehyde), and 340.9 g. (100% theoretical yield) of the phosphite-polyphosphonate, $n_D^{25}$ 1.4807, of the structure

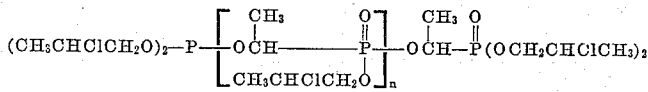

wherein $n$ has an average value of 1.

Heating of the phosphite-diphosphonate as in Example 1 gave the triphosphonate.

*Example 3*

This example shows preparation of a mixture of tris(2-chloropropyl)phosphite and bis(2-chloropropyl)phosphorochloridite by reaction of two moles of phosphorus trichloride with 4.5 moles of propylene oxide, subsequent reaction of said mixture with acetaldehyde to obtain a condensate containing a plurality of phosphonate radicals and a single phosphite group, and isomerization to a product having a plurality of phosphonate radicals and no phosphite group.

A reaction vessel equipped with stirrer, thermometer, a protected water condenser and a protected dropping funnel was swept with nitrogen and then charged with 550 g. (4.0 moles) of phosphorus trichloride and 2.75 g. of ethylene chlorohydrin. The vessel was cooled in a Dry Ice bath as 522 g. (9.0 moles) of propylene oxide was added, during 20 minutes, at a temperature of 10–20° C. (largely 15–20° C.). The colorless reaction mixture was stirred for 0.5 hour to obtain a mixture consisting essentially of tris(2-chloropropyl) phosphite and bis(2-chloropropyl) phosphorochloridite in a one to three molar ratio.

Nuclear magnetic resonance study of the mixture gave a characteristic chemical shift of minus 168.5 p.p.m. (relative to $H_3PO_4$) for the phosphorochloridite and minus 141.8 p.p.m. for the phosphite.

To the mixture of phosphite and phosphorochloridite there was added, during 10 minutes, 145 g. (3.3 moles) of acetaldehyde. During addition of the aldehyde, the temperature of the reaction mixture was maintained at 15–20° C. by cooling, and it was maintained at this temperature for an additional 0.5 hour after all of the aldehyde had been added. At the end of this period, no further heat of reaction was evidenced, and in order to determine whether all of the chloridite had reacted, another 5.0 g. portion of acetaldehyde was added. A 1.0° C. temperature rise was noted; but the addition of another 5.0 g. of the aldehyde caused no temperature change. The colorless reaction mixture was then warmed at 85–90° C. for 0.5 hour to assure complete reaction. By-product propylene dichloride was removed by placing the mixture under vacuum and concentrating, with stirring, to a pot temperature of 125° C./0.5 mm. There was thus obtained as residue 890.0 g. of a polyphosphonate-phosphite of the formula

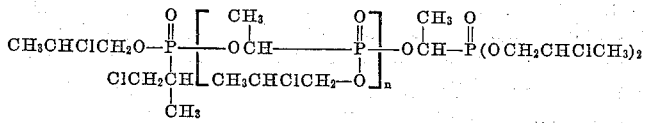

wherein $n$ has an average value of 2.

A 301 g. portion of the polyphosphonate-phosphite was transferred to a flask equipped with a condenser, and it was isomerized by stirring and heating under vacuum to 195° C./0.02 mm. and maintaining it at 195° C.–205° C./0.02 mm. for 0.5 hour. There was obtained, as a colorless liquid residue, the phosphite-free polyphosphonate of the formula.

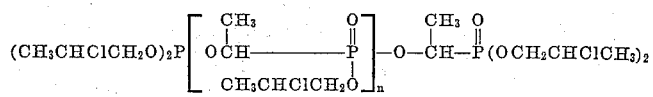

wherein $n$ has an average value of 2.

*Example 4*

This example is like Example 1 except that the phosphorus trichloride and the propylene oxide were employed in a 2:4.75 ratio.

Propylene oxide (552 g., 9.5 moles) was added, during 20 minutes, to a mixture consisting of 550 g. (4.0 moles) of phosphorus trichloride and 2.75 g. of ethylene chlorohydrin while maintaining the temperature of the reaction mixture at 10–20° C. (largely 15–20° C.). A 6.0 g. sample was removed for analysis. To the remainder of the reaction mixture, which consisted essentially of a mixture of tris(2-chloropropyl) phosphite and bis(2-chloropropyl)phosphorochloridite, there was added 127 g. of acetaldehyde, during 5 minutes, while maintaining the temperature of the reaction mixture at 18–20° C. by mild cooling. The colorless reaction mixture was then warmed at 85–90° C. for 0.5 hour, placed under vacuum and concentrated to a pot temperature of 125° C./1.0 mm. to remove by-product propylene dichloride. There was thus obtained as residue 934 g. of the colorless liquid reaction product, $n_D^{25}$ 1.4797, of which two-thirds in moles consisted of a polyphosphonate-phosphite of the formula

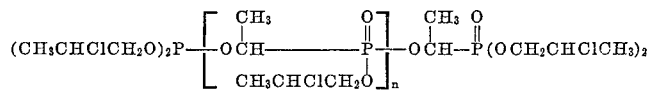

where $n$ is 1.

This mixture, which has an average atomic ratio of $C_{13}H_{26}Cl_{3.5}O_6P_2$, analyzed as follows

|  | Found | Calcd. for $C_{13}H_{26}Cl_{3.5}O_6P_2$ |
| --- | --- | --- |
| Percent C | 33.77 | 33.65 |
| Percent H | 5.83 | 5.65 |
| Percent Cl | 26.62 | 26.75 |
| Percent P | 13.33 | 13.36 |

A 300.5 g. portion of the reaction product was transferred to a flask equipped with a condenser, and it was heated under vacuum with stirring to 195° C./0.2 mm. and maintained at 195–205° C./0.2 mm. for 0.5 hour. There was thus obtained as residue the substantially phosphite-free product.

Hydrolytic stability of the presently obtained products were conducted by adding 250 ml. of carbon dioxide-free distilled water to 25 g. of the test compound, stirring the resulting mixture for 24 hours, and titrating with 0.1 N alcoholic sodium hydroxide in the presence of alcoholic thymol blue indicator. For purposes of comparison, the same test was conducted on the 1:1:1 halidite-aldehyde-phosphite reaction product:

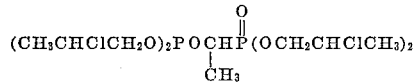

The results, reported as milliequivalents of NaOH/g. of sample, are shown below:

1:1:1 product _____ 0.816
Phosphite-contg. product, this example _____ 0.465
Phosphite-free product, this example _____ 0.193

The above values clearly show that while improvement in hydrolytic stability is achieved by employing a halide-aldehyde-phosphite ratio wherein the latter is present in less than equimolar proportion with respect to the halidite, marked improvement is obtained by isomerization to the phosphite-free product.

*Example 5*

This example is like Example 4 except that it was conducted on a large scale in the pilot plant.

The reaction mixture, comprising the polyphosphonate-phosphite, analyzed as follows:

|  | Found | Calcd. for $C_{13}H_{26}Cl_{3.5}O_6P_2$ |
| --- | --- | --- |
| Percent C | 33.56 | 33.65 |
| Percent H | 5.81 | 5.65 |
| Percent Cl | 26.59 | 26.75 |
| Percent P | 13.39 | 13.36 |

Hydrolytic stability of said reaction mixture, determined as in Example 4, gave a value of 0.402 milliequivalent of NaOH/g. sample.

A 1500 g. portion of said reaction mixture was isomerized to the phosphonate as follows: It was placed in a 2-liter flask and heated, with stirring to about 170° C., whereby a mild exothermic reaction occurred, and the temperature of the reaction mixture remained at 180–188° C. for 0.2 hour without external heating. It was then heated at 190–200° C. for 0.5 hour, cooled to 160° C. and placed under a vacuum of 0.1 mm. Hg pressure as it was allowed to cool. There was thus collected 30.9 g. of propylene dichloride in the Dry Ice trap which formed a part of the equipment, and as residue, 1471 g. (98% theoretical yield) of the phosphite-free product. Testing of the hydrolytic stability thereof, using the method described in Example 4, gave a value of 0.186 milliequivalent of NaOH/g. Nuclear magnetic resonance spectra for phosphorus showed only chemical shifts at −26.0 p.p.m. and −20.8 p.p.m., both characteristic of pentavalent phosphorus of the phosphonate type. There was no evidence of the presence of trivalent phosphorus in the product.

*Example 6*

This example describes reaction of two moles of phosphorus trichloride with 4.5 moles of ethylene oxide to obtain a mixture of tris(2-chloroethyl) phosphite and bis(2-chloroethyl) phosphorochloridite, subsequent reaction of said mixture with acetaldehyde to obtain a polyphosphonate-phosphite, and isomerization of the latter to the phosphite-free product.

To 1100 g. (8.0 moles) of phosphorus trichloride and 8.3 g. of ethylene chlorohydrin there was added 793 g. (18.0 moles) of ethylene oxide during 0.75 hour while maintaining the temperature of the reaction mixture at 10–20° C. (largely 10–15° C.). A 6.0 g. sample was removed for analysis and to the remaining mixture of tris(2-chloroethyl) phosphite and bis(2-chloroethyl) phosphorochloridite there was added 290 g. (6.6 moles, 10% excess) of acetaldehyde during 0.3 hour while maintaining the temperature of the reaction mixture at 25–30° C. by cooling. When all of the acetaldehyde had been added, cooling was discontinued, and the temperature of the reaction mixture increased spontaneously to 52° C. The mixture was then warmed at 85–90° C. for 0.5 hour, cooled to 30° C. and then concentrated to a pot temperature of 110° C./1 mm. to give 553.5 g. of ethylene dichloride in the Dry Ice trap and as residue a polyphosphonate-phosphite of the formula

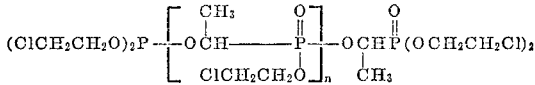

where $n$ has an average value of 2.

Testing of the hydrolytic stability of the polyphosphonate-phosphite, employing the procedure described in Example 4, gave a value of 0.966 milliequivalent NaOH/g. sample as compared to 1.852, the value obtained by similar testing of the phosphite-phosphonate of the formula

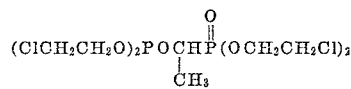

Conversion of the polyphosphonate-phosphite to the phosphite-free product was conducted by heating it at 190° C.–200° C. for 0.5 hour and concentrating to 180° C./0.5 mm. There was thus obtained the polyphosphonate, $n_D^{25}$ 1.4927, of the formula

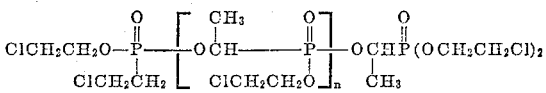

where $n$ has an average value of 2. Nuclear magnetic resonance measurements for phosphorus showed that only pentavalent phosphorus of the phosphonate type was present. Testing of the hydrolytic stability of this phosphite-free polyphosphonate by the procedure of Example 4 gave a value of 0.184 milliequivalent NaOH/g. sample. It will be noted that this is about one-tenth of the value obtained with the phosphite-phosphonate and about one-fifth of the value obtained with the phosphite-polyphosphonate.

Example 7

This example shows the preparation of a phosphite-polyphosphonate from two moles of phosphorus trichloride and 4.5 moles of ethylene oxide and acetaldehyde as in Example 6 and then distillation of the by-product ethylene dichloride as the product was heated for conversion to polyphosphonate.

A mixture of tris(2-chloroethyl) phosphite and bis(2-chloroethyl) phosphorochloridite was prepared by adding 793 g. (18.0 moles) of ethylene oxide to a mixture consisting of 1100 g. (8.0 moles) of phosphorus trichloride and 8.2 g. of ethylene chlorohydrin with cooling at 10–20° C. (largely 10–15° C.) during 1.25 hour.

After removing a 6.0 g. sample from the reaction product, the remainder, which consisted of tris(2-chloroethyl) phosphite and bis(2-chloroethyl) phosphorochloridite in a 1:3 ratio, was treated with 290 g. (6.6 moles, 10% excess) of acetaldehyde at 20–30° C. during 0.2 hour. Cooling was applied to maintain this temperature during addition of the acetaldehyde and for another 0.7 hour after the aldehyde had been added. The reaction temperature was finally allowed to increase spontaneously to 41° C. The resulting reaction mixture consisted of an ethylene dichloride solution of the polyphosphonate-phosphite of the formula

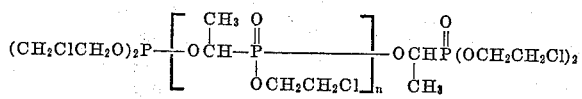

where $n$ has an average value of 2. Nuclear magnetic resonance measurements on this product showed a characteristic chemical shift of $-142$ p.p.m. relative to $H_3PO_4$ for the trivalent phosphorus and of $-22$ p.p.m. for the pentavalent phosphorus.

The above polyphosphonate-phosphite was isomerized to the phosphite-free compound as the by-product ethylene dichloride was distilled and the residue was finally heated at 195–201° C. for 0.3 hour, whereby 584 g. of ethylene dichloride was collected. The residue was cooled to 150° C. and then concentrated to 160° C./0.2 mm. to give an additional 45.0 g. of ethylene dichloride and as residue 1571 g. of the polyphosphonate of the formula

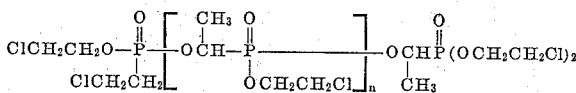

where $n$ has an average value of 2. Nuclear magnetic resonance measurements showed that only pentavalent phosphorus of the phosphonate type was present.

Vapor phase chromatography showed that the distillate was at least 99% ethylene dichloride.

Example 8

This example shows preparation of a polyphosphonate-phosphite by reaction of 1.75 moles of acetaldehyde with a mixture of tris(2-chloropropyl) phosphite and bis(2-chloropropyl) phosphorochloridite prepared by reacting two moles of phosphorus trichloride with 4.25 moles of propylene oxide, and conversion of the polyphosphonate-phosphite to the phosphite-free product.

To a mixture consisting of 550 g. (4.0 moles) of phosphorus trichloride and 2.75 g. of ethylene chlorohydrin there was added, with cooling during 0.4 hour, 493 g. (8.50 moles) of propylene oxide. About the first two-thirds of the oxide was added at a temperature of 5–15° C. and the last one-third at 0–5° C. A 9.0 g. sample of the resulting reaction mixture was removed for analysis and the residual mixture, consisting essentially of tris(2-chloropropyl) phosphite and bis(2-chloropropyl) phosphorochloridite in a 1:7 molar ratio, was treated with 177 g. (4.0 moles, 15% excess) of acetaldehyde during 0.3 hour with cooling to keep the temperature of the reaction mixture at 20–25° C. When no further heat of reaction was evidenced, the mixture was warmed to 80° C. and maintained at 80–90° C. for 0.5 hour to assure complete reaction. It was then concentrated, with stirring, to 160° C./0.5 mm. to give as residue 398 g. of the colorless, viscous polyphosphonate-phosphite which analyzed as follows:

|  | Found | Calcd. for $C_{22}H_{44}Cl_5O_{12}P_4$ |
| --- | --- | --- |
| Percent C | 33.35 | 33.0 |
| Percent H | 5.53 | 5.54 |
| Percent Cl | 22.59 | 22.1 |
| Percent P | 15.06 | 15.5 |

Testing of the hydrolytic stability of the presently prepared polyphosphonate-phosphite as described in Example 4 gave a value of 0.392 milliequivalent NaOH/g. sample.

Conversion of the polyphosphonate-phosphite to the phosphite-free product was effected by heating as in Example 7.

Example 9

This example describes the preparation of a polyphosphonate-phosphite by reacting two moles of phosphorus trichloride with 4.75 moles of propylene oxide to obtain a mixture of tris-(2-chloropropyl) phosphite and bis(2-chloropropyl) phosphorochloridite and subsequent reaction of said mixture with formaldehyde.

To a cooled mixture consisting of 550 g. (4.0 moles) of phosphorus trichloride and 2.75 g. of ethylene chlorohydrin there was added, during 0.4 hour, 552 g. (9.5 moles) of propylene oxide while maintaining the temperature of the reaction mixture at 12–20° C. A 6 g. sample of the reaction mixture was removed. The remaining mixture of tris(2-chloropropyl) phosphite and bis(2-chloropropyl) phosphorochloridite was warmed to 40° C., and 150 g. of formaldehyde was distilled into said mixture during 1.25 hour while maintaining the temperature of the reaction mixture at 45–65° C. by occasional cooling. The residue was then distilled to a pot temperature of 150° C., placed under vacuum and concentrated to a pot temperature of 160° C./0.05 mm. to give as residue 918 g. of the colorless, liquid reaction mixture of which two-thirds in moles consisted of a polyphosphonate-phosphite of the formula

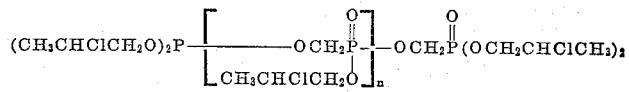

where $n$ is 1.

A 502 g. portion of said reaction mixture was placed in a 500 cc. flask, stirred and heated to 200° C. and then maintained at 195–200° C. for 0.5 hour. After allowing it to cool to 150° C., it was concentrated to 190° C./0.05 mm. to give 12 g. of by-product which collected in the Dry Ice trap that formed a part of the equipment and 488 g. (97% recovery) of product wherein the phosphorus was present only as phosphonate. Testing of the hydrolytic stability of the present product as described in Example 4 gave a value of 0.322 milliequivalent of NaOH/g. sample.

Example 10

This example shows reaction of a mixture of phosphorochloridite, phosphite and aldehyde wherein there is employed a very large excess of chlorodite and aldehyde with respect to the phosphite.

To a solution consisting of 15.6 g. (0.05 mole) of tris(2-chloropropyl) phosphite and 139.5 g. (0.55 mole) of bis-(2-chloropropyl) phosphorochloridite dissolved in 100 g. of chloroform, there was added during 0.1 hour, 29 g. (0.65 mole) of acetaldehyde, whereby there was observed a spontaneous temperature increase to 55° C. The reaction mixture was then distilled to a pot temperature of 120° C. and subsequently concentrated to a pot temperature of 190° C./2 mm. to give as residue 113.0 g. (97% theoretical yield) of the polyphosphonate of the formula

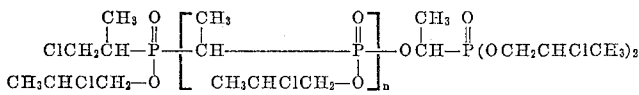

where $n$ has an average value of 10.

*Example 11*

A polyphosphonate having dissimilar alcohol residues was prepared as follows:

To a solution consisting of 16.5 g. (0.065 mole) of bis(2 - chloropropyl) phosphorochloridite and 5.4 g. (0.0325 mole) of triethyl phosphite in 30 ml. of methylene chloride there was added during 0.1 hour 3.8 g. (0.065 mole) of propionaldehyde while maintaining the temperature of the reaction mixture at 20°–30° C. by cooling. When the heat of reaction had subsided (about 0.1 hour after all of the aldehyde had been added), the mixture was warmed at reflux for 0.5 hour, distilled to a pot temperature of 70° C., and then concentrated to 107° C./0.02 mm. to obtain the phosphite-polyphosphonate, $n_D^{25}$ 1.4696.

After removing a 4.7 g. sample of the phosphite-polyphosphonate for analysis, the residue was converted to the phosphite-free product by heating it at 190°–195° C. for 0.2 hour and then concentrating to 170° C./0.05 mm. to give 15.0 g. (99% theoretical yield) of the colorless, liquid polyphosphonate, $n_D^{25}$ 1.4715, of the formula:

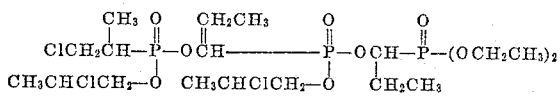

*Example 12*

Bis(2-chloropropyl) phosphite of bis(2-chloropropyl) 1-hydroxyethylphosphonate was prepared by reaction of an equimolar mixture of tris(2-chloropropyl) phosphite and bis(2-chloropropyl) phosphorochloridite with acetaldehyde. A 426.5 g. portion was isomerized to the diphosphonate by heating at 190° C. to 205° C. for 0.75 hour. Concentration to 165° C./0.02 mm. gave 411.5 g. (97% theoretical yield) of the substantially pure diphosphonate, $n_D^{25}$ 1.4788, of the formula

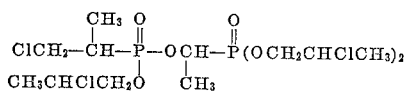

*Example 13*

The tris(2-chloroethyl) phosphite of bis(2-chloroethyl) 1-hydroxyethylphosphonate of the formula

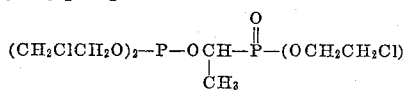

was prepared by the process described in my application, Serial No. 780,209, filed December 15, 1958, by adding acetaldehyde to a substantially equimolar mixture of tris-(2-chloroethyl) phosphite and bis(2-chloroethyl) phosphorochloridite with cooling and removing by-product propylene dichloride from the resulting reaction mixture.

Isomerization of the above phosphite-phosphonate to the phosphite-free product was effected by placing 3178 g. thereof in a 5-liter flask, stirring and warming with a mantle to 165–175° C. whereby a mildly exothermic reaction appeared to be initiated, maintaining the reaction mixture at 180–200° C. for 0.5 hour, at 195–200° C. for another 0.5 hour, cooling to 150° C. and finally concentrating to 170° C./0.2 mm. to give as residue a 97.5% theoretical yield of the phosphite-free phosphonate, $n_D^{25}$ 1.4913 of the formula

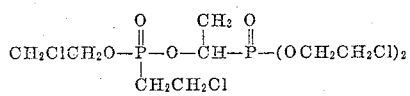

Testing of the hydrolytic stability of the presently prepared diphosphonate gave a value of 0.149 milliequivalent NaOH/g. sample as compared to 1.852, the value for the unisomerized phosphite, i.e., the bis(2-chloroethyl) phosphite of bis(2-chloroethyl) 1-hydroxyethylphosphonate. In both instances the hydrolytic stability tests were conducted as described in Example 4.

*Example 14*

This example describes the preparation of phosphite-free polyphosphonate by reaction of two moles of phosphorus trichloride with 4.8 moles of 1,2-epoxy-3-isopropoxypropane to obtain a mixture of phosphite and phosphorochloridite, reaction of said mixture with undecaldehyde to obtain the polyphosphonate-phosphite, and heat treatment of the latter to form the phosphite-free product.

To a mixture consisting of 49.2 g. (0.358 mole) of phosphorus trichloride, 0.5 g. of ethylene chlorohydrin and 100 ml. of methylene dichloride there was gradually added, during 0.2 hour, 100 g. (0.860 mole) of 1,2-epoxy-3-isopropoxypropane while cooling the reaction mixture to maintain the temperature thereof at 20–30° C. The whole was then maintained at 25–30° C. for 0.2 hour and subsequently warmed at reflux for 0.3 hour. After removing a 5.0 g. sample of the reaction product for analysis, the remaining mixture of tris(2-chloro-3-isopropoxypropyl) phosphite and bis(2-chloro-3-isopropoxypropyl) phosphorochloridite was treated with 36.6 g. (0.215 mole) of n-undecanal during about 5 minutes at 35–47° C. The resulting reaction mixture was warmed at reflux for 1.0 hour, concentrated at water-pump pressure to 125° C., and finally to 135° C./1.0 mm. to give as residue 159.8 g. of a phosphite-phosphonate product of which two-thirds in moles consisted of the polyphosphonate-phosphite of the formula

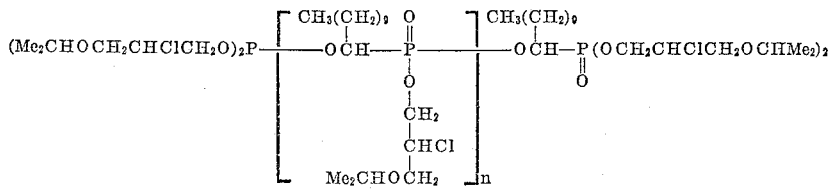

where Me is the methyl radical and $n$ has an average value of 1.

Evaluation of hydrolytic stability of the presently provided polyphosphonate-phosphite employing the procedure described in Example 4 gave a value of 0.539 milliequivalent of NaOH/g. sample.

A 75 g. portion of the above phosphite-phosphonate product was heated with stirring at 195–200° C. for 0.25 hour, cooled to 130° C. and then concentrated to 160° C./0.2 mm. to give 71.5 g. of the phosphite-free product. Testing of the hydrolytic stability thereof by the procedure described in Example 4 gave a value of 0.290 milliequivalent of NaOH/g. sample.

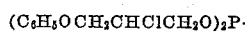 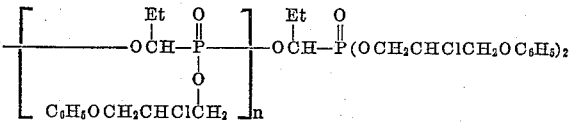

Example 15

This example describes the preparation of a polyphosphonate-phosphite by the reaction of two moles of phosphorus trichloride with 4.8 moles of butadiene monoxide to obtain a mixture of phosphite and phosphorochloridite and reaction of said mixture with propionaldehyde.

To a cooled (10–15° C.) mixture consisting of 274.7 g. (2 moles) of phosphorus trichloride and 2.7 g. of ethylene chlorohydrin there was added, during 0.3 hour, 336 g. (4.8 moles) of butadiene monoxide. A 5.5 g. sample of the reaction mixture was removed and to the remaining mixture of tris(2-chloro-3-butenyl) phosphite and bis(2-chloro-3-butenyl) phosphorochloridite there was added 101.5 g. (1.75 moles) of propionaldehyde during 0.3 hour at a temperature of 20–35° C. The whole was then warmed to 70° C. and concentrated to 102° C./4.0 mm. to give as residue 562.5 g. of phosphite-phosphonate product, of which two-thirds in moles consisted of the polyphosphonate-phosphite of the formula

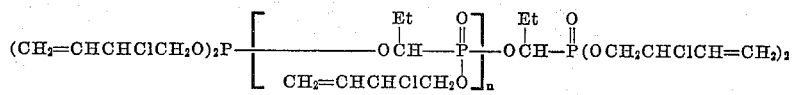

where Et is the ethyl radical and $n$ is 1.

A 300 g. portion of said phosphite-phosphonate product was heated to 182° C. and then concentrated to 185° C./0.5 mm. to give 271.5 g. of the phosphite-free polyphosphonate. Testing of the hydrolytic stability of this product by the procedure of Example 4 gave a value of 0.184 milliequivalent of NaOH/g. sample whereas like testing of said phosphite-phosphonate product previous to the isomerization step gave a value of 0.996.

Example 16

This example describes preparation of a phosphite-free polyphosphonate by reaction of two moles of phosphorus trichloride with 4.8 moles of 1,2-epoxy-3-phenoxypropane, reaction of the resulting mixture of phosphite and phosphorochloridite with propionaldehyde, to obtain a polyphosphonate-phosphite, and conversion of the latter to give the phosphite-free product.

To a mixture consisting of 137.3 g. (1.0 mole) of phosphorus trichloride, 1.5 g. of ethylene chlorohydrin and 200 ml. of methylene dichloride there was added, during 0.25 hour, 360 g. (2.4 moles) of 1,2-epoxy-3-phenoxypropane. The temperature of the reaction mixture increased spontaneously to reflux (pot temperature of 58° C.) during the addition, and subsequent heating of the reaction kept the mixture at reflux for 1.5 hour. To the resulting reaction mixture, comprising tris(2-chloro-3-phenoxypropyl) phosphite and bis(2-chloro-3-phenoxypropyl) phosphorochloridite, there was added 71.8 g. (1.24 moles) of propionaldehyde during 0.2 hour while maintaining the temperature of the reaction mixture at 35–50° C. by cooling. The whole was then warmed at reflux for 0.5 hour and concentrated to 115° C./2 mm. to give as residue 558 g. of a mixture of by-product 2,3-dichloropropyl phenyl ether and phosphite-phosphonate product of which 50% in moles consisted of the polyphosphonate-phosphite product of the formula

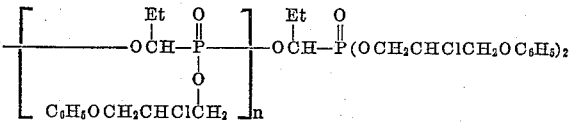

where Et is the ethyl radical and $n$ is 1.

A 300 g. portion of said mixture was heated to 200° C. and then concentrated to 200° C./1 mm. to give 66.5 g. of by-product, 2,3-dichloropropyl phenyl ether and as residue 226.7 g. of the phosphite-free polyphosphonate.

Example 17

This example describes preparation of a phosphite-free phosphonate product by reaction of two moles of phosphorus trichloride with 4.8 moles of ethylene oxide to obtain a mixture of phosphite and phosphorochloridite, reaction of said mixture with furfural to give the polyphosphonate-phosphite and conversion of the latter to the phosphite-free polyphosphonate.

To a mixture consisting of 1100 g. (8.0 moles) of phosphorus trichloride and 8.2 g. of ethylene chlorohydrin there was introduced, during 1.2 hour, 845 g. (19.2 moles) of ethylene oxide at 10–20° C. To one-half (973 g.) of the resulting mixture of tris(2-chloroethyl) phosphite and bis(2-chloroethyl) phosphorochloridite there was added 231 g. (2.4 moles) of furfural during 0.2 hour. The whole was then warmed to 90° C. whereupon an exothermal reaction occurred and cooling was required to maintain the temperature of the reaction mixture at 85–95° C. for 0.5 hour. It was finally warmed at 100–105° C. for 0.5 hour and concentrated to 100° C./2 mm. to give as residue a phosphite-phosphonate product of which 50% consisted of a phosphonate-phosphite of the formula

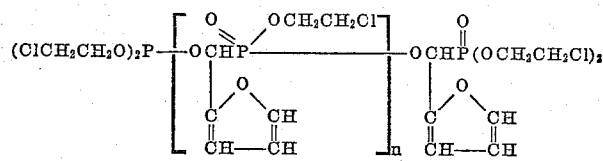

where $n$ is 1.

A 300 g. portion of said phosphite-phosphonate product was heated to 195° C. and then concentrated to 180° C./0.5 mm. to give as residue 293 g. (98% theoretical yield) of the phosphite-free polyphosphonate.

Example 18

This example describes the preparation of a phosphite-free product by reaction of two moles of phosphorus trichloride and 4.8 moles of ethylene oxide, subsequent reaction of the resulting mixture of phosphite and phosphorochloridite with β-methylmercaptopropionaldehyde to obtain a polyphosphonate-phosphite, and conversion of the latter to the phosphite-free polyphosphonate product.

To 244 g. of the mixture of tris(2-chloroethyl) phosphite and bis(2-chloroethyl) phosphorochloridite prepared in Example 17 there was added, during 0.2 hour, 62.5 g. (0.6 mole) of β-methylmercaptopropionaldehyde while maintaining the temperature of the reaction mixture at 30–40° C. The whole was then warmed to 80° C. and concentrated to 102° C./0.3 mm. to give 59.5 g. of ethylene dichloride in the Dry Ice trap which formed a part of the reaction equipment and as residue a phosphite-phosphonate product of which 50% in moles consisted of the polyphosphonate-phosphite of the formula

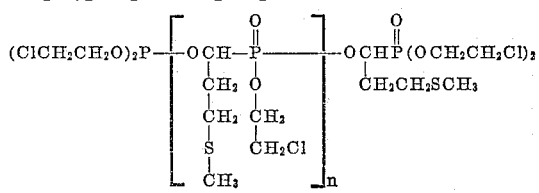

where $n$ is 1.

A 7 g. sample of said phosphite-phosphonate product was removed for analysis, and the remainder was heated to 200° C., cooled to 140° C., and then concentrated to 165° C./0.3 mm. to give as residue 219 g. of the phosphite-free product of which 50% in moles consisted of the diphosphonate

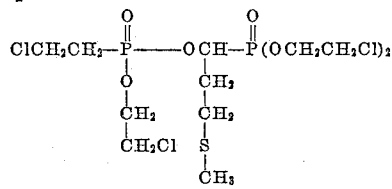

and 50% in moles of the polyphosphonate

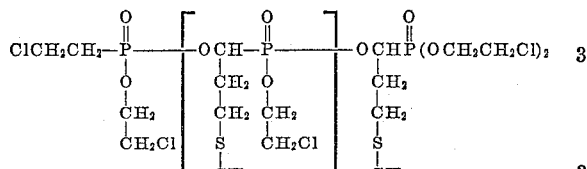

in which $n$ is 1.

*Example 19*

This example describes preparation of a phosphite-free phosphonate using acrolein as the aldehyde.

To 486.5 g. of the mixture of tris(2-chloroethyl) phosphite and bis(2-chloroethyl) phosphorochloridite prepared in Example 16 there was added 70.6 g. of acrolein during one hour while maintaining the temperature at 10–20° C. by cooling. The whole was then warmed to 90° C. and concentrated to 140° C./0.3 mm. to give 437 g. of a phosphite-phosphonate product of which 50% in moles consisted of the polyphosphonate-phosphite of the formula

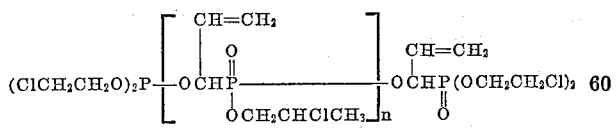

where $n$ is 1.

A 200 g. sample of said phosphite-phosphonate product was heated at 190–200° C. for 0.3 hour and concentrated to 187° C./0.3 mm. to give as a residue 194.7 g. (97% theoretical yield) of the phosphite-free phosphonate, i.e., a mixture of

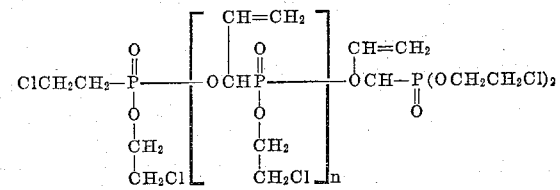

where $n$ is 1, and

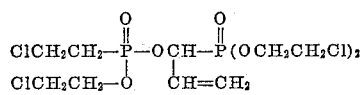

Hydrolytic stability of this product determined according to the procedure described in Example 4 gave a value of 0.641 milliequivalent of NaOH/g. sample as compared to 1.930, the similarly obtained value for the phosphite-phosphonate product previous to the isomerization step.

*Example 20*

This example is like Example 19 except that different halidite and ester are used.

To a cooled mixture consisting of 1100 g. (8.0 moles) of phosphorus trichloride and 8.2 g. of ethylene chlorohydrin there was added, during 0.8 hour, 1136 g. (19.6 moles) of propylene oxide while maintaining the temperature of the reaction mixture at 10–20° C. (largely 10–15° C.). A 6.5 g. sample of the reaction mixture was removed and to the remaining mixture of tris(2-chloropropyl) phosphite and bis(2-chloropropyl) phosphorochloridite there was added during 0.25 hour, 246.6 g. (4.4 moles) of acrolein while maintaining the temperature of the reaction mixture at 24–30° C. by cooling. When cooling was discontinued the temperature of the reaction mixture increased spontaneously to 41° C. It was then heated to 103° C. and maintained at 85–103° C. for 0.75 hour. Concentration of the resulting mixture to 120° C./1 mm. gave 455.5 g. of by-product propylene dichloride, which collected in the Dry Ice trap forming part of the equipment, and as residue a phosphonate-phosphite product, of which two-thirds in moles consisted of the polyphosphonate of the formula

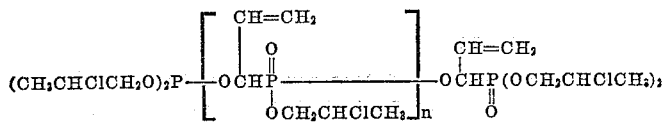

where $n$ is 1.

A portion of said phosphonate-phosphite product was heated to about 185° C. at which point an exothermic reaction slowly increased the temperature to 200° C. Heating was continued at 185–200° C. for 0.5 hour. The reaction mixture was then cooled to 140° C., placed under vacuum and concentrated to a pot temperature of 167° C./1 mm. to give as residue the phosphite-free phosphonate. Hydrolytic stability of this product determined according to the procedure described in Example 4 gave a value of 0.608 milliequivalent of NaOH/g. sample as compared to 1.570, the similarly obtained value for the unisomerized product, i.e., the phosphonate-phosphite product previous to the heating step.

*Example 21*

This example discloses the use of an aldehyde ester in the preparation of a phosphite-free phosphonate.

To 72 g. of a mixture of tris(2-chloroethyl) phosphite and bis(2-chloroethyl) phosphorochloridite prepared by the reaction of two moles of phosphorus trichloride with 4.8 moles of ethylene oxide there was added with ice cooling in one portion, 19.5 g. (0.15 mole) of ethyl 3-formylpropionate. The temperature of the reaction mixture increased spontaneously from 28° C. to 52° C. When there was no further evidence of exothermal reaction, the mixture was warmed to 83° C. and then concentrated to a pot temperature of 122° C./0.6 mm. to give 13.4 g. (90% theoretical yield) of by-product ethylene dichloride in the Dry Ice trap and 78.5 g. of the phosphite-polyphosphate, $n_D^{25}$ 1.4863, of which 50% in moles consisted of the formula

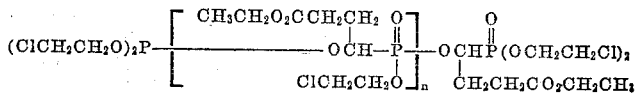

where $n$ is 1.

The phosphite-phosphonate product was converted to the phosphite-free material by heating a 25 g. portion thereof to 200° C., and concentrating under vacuum to 170° C./0.5 mm. There was thus obtained as residue 24.4 g. of the phosphite-free product, $n_D^{25}$ 1.4870, of which about 50% in moles consisted of the polyphosphonate of the formula

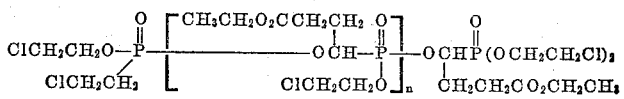

where $n$ is 1, and the remainder consisted essentially of the diphosphonate of the formula

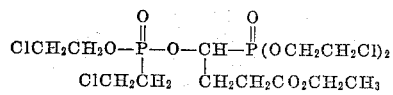

Example 22

To a mixture consisting of 716 g. (4.0 moles) of phenylphosphonous dichloride and 7.1 g. of ethylene chlorohydrin there was added 336 g. (5.8 moles) of propylene oxide during 0.25 hour while maintaining the temperature of the reaction mixture at 0–5° C. by means of Dry Ice cooling. The reaction was rapid, very exothermic, and was complete by the time all of the propylene oxide had been added. A 7.0 g. sample of the reaction product was removed for analysis and to the remaining reaction product, consisting of 2-chloropropyl phenylphosphonochloridite and bis(2-chloropropyl) phenylphosphonite, there was added, during 0.2 hour, 107 g. (2.42 moles) of acetaldehyde. Moderate cooling was employed to keep the temperature below 32° C. during the addition of the aldehyde and for about 0.25 hour after all of the aldehyde had been added. The colorless, viscous reaction mixture was then warmed at 55–65° C. for one hour and then concentrated to 90° C./1 mm. to give 207.5 g. of the by-product propylene dichloride in the Dry Ice trap which formed a part of the reaction equipment and as residue 946.5 g. of a phosphonite-phosphinate product, $n_D^{25}$ 1.5478, of which 22% in moles consisted of the polyphosphorus compound of the formula

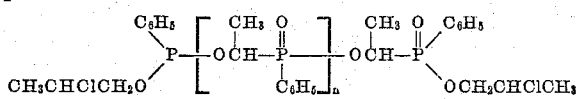

where $n$ is 1.

Isomerization of the trivalent phosphorus ester radical in said phosphonite-phosphinate was effected as follows. A 300 g. portion of the product was heated to 190° C. and concentrated to 190° C./0.3 mm. to give another 14.0 g. of propylene dichloride and as residue 287 g. (99% theoretical yield, based on the starting material) of the colorless liquid polyphosphinate, $n_D^{25}$ 1.5509, consisting of the polyphosphorus compound of the structure

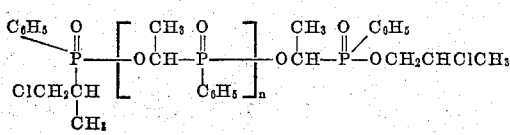

where $n$ is 1, and of the compound

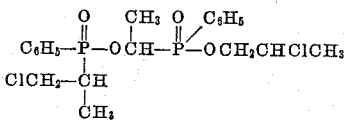

Nuclear magnetic resonance spectra for phosphorus showed a chemical shift only at −38.0 p.p.m. which is characteristic of phosphinates of this type.

Example 23

This example describes the preparation of a phosphite-free polyphosphonate by reacting two moles of phosphorus trichloride with 4.9 moles of epichlorohydrin to obtain a mixture of phosphite and phosphorochloridite, reacting said mixture with acetaldehyde to obtain the polyphosphonate-phosphite and converting the latter to the phosphite-free product.

To a mixture consisting of 413 g. (3.0 moles) of phosphorus trichloride and 4.1 g. of ethylene chlorohydrin there was added, during 0.4 hour, 680 g. (7.35 moles) of epichlorohydrin. Because at the beginning of the addition of the epichlorohydrin only mild heat of reaction was noted, the reaction mixture was warmed to 60° C. At that point the reaction was sufficiently vigorous that the temperature remained at 60–65° C. without external heating during addition of the remainder of the epichlorohydrin. The temperature was then allowed to increase to 90° C. and it was maintained at 85–90° C. by moderate cooling for 0.75 hour. After standing overnight, a 6.0 g. sample of the reaction mixture was removed for analysis and to the remaining mixture of tris(2,3-dichloropropyl) phosphite and bis(2,3-dichloropropyl) phosphorochloridite there was added, during 0.3 hour, 83.5 g. (1.9 moles) of acetaldehyde while maintaining the temperature of the reaction mixture at 20–30° C. by cooling. It was then warmed to reflux (105° C.) and distilled to a pot temperature of 130° C. and finally concentrated to 150° C./2.0 mm. to give 987 g. of a colorless, liquid residue consisting of polyphosphonate-phosphites of the formulae:

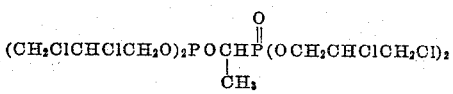

and

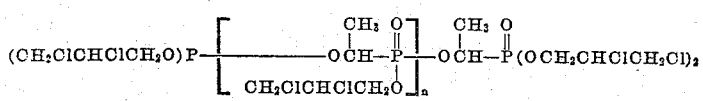

where $n$ is 1.

A 300 g. sample of the polyphosphonate-phosphites was placed in a 500 cc. flask and stirred and heated at 195–200° C. for 0.5 hour. The reaction mixture was allowed to cool to 140° C. and then concentrated to 185° C./0.5 mm. to give as residue 279.5 g. of phosphite-free polyphosphonates. Testing of the hydrolytic stability thereof by the procedure described in Example 4 gave a value of 0.548 milliequivalent of NaOH/g. sample as compared to 1.302, the value obtained by like testing of the polyphosphonate-phosphite previous to the isomerization by heat.

Example 24

This example describes the preparation of phosphite-free polyphosphonate by the reaction of two moles of phosphorus tribromide with 4.9 moles of epichlorohydrin to give a mixture of phosphite and phosphorobromidite, reaction of the resulting mixture with acetaldehyde to obtain a polyphosphonate-phosphite, and conversion of the latter to the phosphite-free product.

To a mixture consisting of 507.0 g. (1.87 moles) of phosphorus tribromide and 2.5 g. of ethylene chlorohydrin there was added 415 g. (4.49 moles) of epichlorohydrin during 0.3 hour. There was only mild heat of reaction, so the temperature was allowed to increase spontaneously during addition of the epichlorohydrin. The reaction mixture was then maintained at 50–60° C. with mild cooling until there was no further heat of reaction (1.25 hour), and subsequently warmed for 0.5 hour at 55–60° C. to assure complete reaction. After removing a 10.0 g. sample of the reaction mixture for analysis, the remaining mixture of tris(2-bromo-3-chloropropyl) phosphite and bis(2-bromo-3-chloropropyl) phosphorobromidite was cooled to 20° C. and there was added thereto 57 g. (1.29 moles) of acetaldehyde during 0.1 hour while maintaining the temperature at 20–30° C. by cooling. When all of the aldehyde had been added, the mixture was kept at 50–55° C. for 0.5 hour by cooling and when there was no further evidence of exothermal reaction, an additional 10 g. of acetaldehyde was added. A temperature rise of 1° C. was noted. The whole was then warmed to 80° C. and concentrated to 100° C./0.05 mm. to give by-product 2-bromo-1-chloropropane in the Dry Ice trap which formed part of the equipment and as residue 850 g. of polyphosphonate-phosphite product consisting of

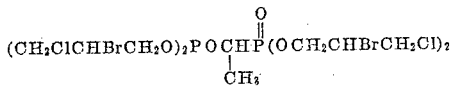

and

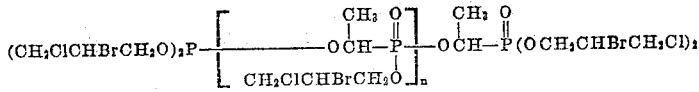

where n is 1.

Evaluation of the hydrolytic stability of the presently prepared polyphosphonate-phosphite mixture using the method described in Example 4 gave a value of 0.304 milliequivalent of NaOH/g. sample.

A 403 g. portion of the above mixture was stirred and heated to 200° C., cooled to 150° C. and then concentrated to 190° C./0.3 mm. to give as residue 338 g. of the phosphite-free product. Testing of the hydrolytic stability of this product by the procedure of Example 4 gave a value of 0.115 milliequivalent of NaOH/g. sample.

Example 25

To 1472 g. of a mixture consisting of 2.98 moles each of tris(2-chloroethyl) phosphite and bis(2-chloroethyl) phosphorochloridite there was added, during 0.5 hour, 318 g. (3.0 moles) of benzaldehyde with mild cooling to maintain the temperature of the reaction mixture at 15–27° C. The whole was then allowed to warm spontaneously to a maximum temperature of 43° C. and subsequently heat was applied and the reaction mixture was stirred at 70–95° C. for 2 hours. After standing overnight, the reaction mixture was then concentrated, with stirring, to a pot temperature of 125° C./0.2 mm. to give as residue 1481 g. (99% theoretical yield) of the substantially pure bis(2-chloroethyl) phosphite of bis(2-chloroethyl) α-hydroxybenzylphosphonate, $n_D^{25}$ 1.5285, which analyzed as follows:

| | Found | Calcd. for $C_{15}H_{22}Cl_4O_6P_2$ |
|---|---|---|
| Percent C | 35.9 | 35.68 |
| Percent H | 4.42 | 4.51 |
| Percent Cl | 28.3 | 28.09 |
| Percent P | 12.35 | 12.04 |

Determination of the hydrolytic stability of this compound by the procedure of Example 4 gave a value of 2,590 milliequivalents of NaOH/g. sample.

The presently prepared phosphite-phosphonate was converted to the phosphonate as follows: A 304 g. portion of the compound was transferred to a flask, heated at 198–203° C./0.1 mm. for 0.5 hour and subsequently distilled to remove material boiling below 150° C./0.1 mm. There was thus obtained as residue 270.2 g. of α-[bis(2-chloroethoxy)phosphinyl] benzyl 2-chloroethyl 2-chloroethylphosphonate of the formula

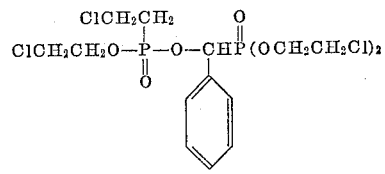

Determination of the hydrolytic stability of this compound by the procedure of Example 4 gave a value of 0.876 milliequivalent of NaOH/g. sample.

Example 26

Since it has been established that there is a close relationship between the quantity of a material required to suppress glowing and the effectiveness of the same material for reducing preignition of a leaded fuel in gasoline engines, testing of the presently prepared polyphosphorus compounds was conducted by a glow test method wherein the following procedure was employed:

Test blends were prepared by blending (1) 5 ml. of a fuel consisting of a high-boiling (380–420° F.) hydrocarbon fraction containing approximately 130 mg. of lead based on the quantity of a commercial tetraethyllead-halohydrocarbon additive (hereinafter referred to as TEL) which had been incorporated therein and 1 ml. of an SAE 30 grade lubricating oil with (2) graduated, precisely weighed quantities of one of the polyphosphorus compounds to be tested, said quantities being in the range of 0.01 to 2.0 times the quantity of lead present. Two ml. of the test blend was then dropped at a constant rate (1.5±0.1 ml./15 minutes), during a 15–17 minute period, onto a reagent grade decolorizing carbon contained in a crucible maintained in a furnace at a temperature which was high enough to keep the bottom of the crucible at ca. 1,000° F. By using test blends containing progressively lower quantities of the test compound, there was determined the minimum concentration of the test compound at which no glowing of the carbon was evidenced either during the dropping period or after all of the test sample had been added. Under these conditions, a "control" sample, i.e., one which contained all of the constituents of the test blend except the polyphosphorus compound caused the carbon to glow throughout addition thereof and after addition had been completed. On the other hand, no glowing was observed when there was present in the test blend 0.0400 g./5 ml. of said fuel of the polyphosphorus compound prepared by reacting two moles of phosphorus trichloride with 4.75 moles of propylene oxide to obtain a mixture of one molar equivalent of bis(2-chloropropyl) phosphorochloride and less than a molar equivalent of tris(2-chloropropyl) phosphite reacting said mixture with a molar equivalent of acetaldehyde, to obtain a phosphite-phosphonate and heating the latter to form the phosphite-free compound, i.e., the phosphite-free polyphosphonate of Example 4.

Instead of said Example 4 product, there may be used, for the purpose of effectively inhibiting preignition of leaded fuels, any of the gasoline-soluble phosphite-free products prepared according to the present process. While, as will be obvious to those skilled in the art, the compound to be useful must be present in the gasoline in soluble form, it will also be realized that since the additive is employed in only very low concentrations, gasoline solubility at the useful concentrations is possessed by the great preponderance of the presently prepared compounds. Whether the phosphite-free product is soluble in the gasoline at the effective concentration can be readily ascertained by routine experimentation.

Inasmuch as the crude reaction mixture obtained by the present process comprises an aliphatic halohydrocarbon as by-product, the latter obviously can serve conveniently as the lead scavenger in leaded gasoline fuels containing the presently prepared pentavalent phosphorus esters.

Leaded gasolines containing the presently prepared phosphite-free compounds are compatible with other additives customarily used in the art, e.g., rust-inhibitors, stabilizers or antioxidants, dyes, etc. The pentavalent phosphorus esters of this invention may be employed in different proportions than specifically shown and with such other additives and adjuvants.

The presently provided process is particularly useful because of the broad variation of products that can be obtained. Not only can the reactants be varied to give innumerable products, but the ratio of reactants can be changed to even further multiply the products obtainable. Of considerable usefulness is the variation in properties, such as change of viscosity, volatility, fire resistance, hydrolytic stability, solubility, and polarity that can be made by change of reactant ratios.

What I claim is:

1. A pentavalent phosphorus ester selected from the class consisting of diesters of the formula:

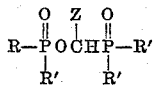

and polyesters of the formula

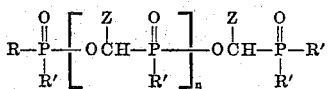

where R is selected from the class consisting of haloalkyl, haloalkenyl, alkoxyhaloalkyl and aryloxyhaloalkyl radicals of from 1 to 12 carbon atoms, R' is selected from the class consisting of —OR, —O—hydrocarbon and hydrocarbon radicals of from 1 to 12 carbon atoms and aromatic halohydrocarbon radicals of from 6 to 12 carbon atoms, Z is selected from the class consisting of hydrogen, hydrocarbon, halohydrocarbon, cyanohydrocarbon, carboalkoxyhydrocarbon, alkoxyhydrocarbon and alkylthiohydrocarbon radicals of from 1 to 17 carbon atoms and the thienyl and furyl radicals and $n$ is a number of at least 1.

2. A pentavalent phosphorus diester of the formula:

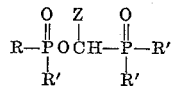

in which R is selected from the class consisting of haloalkyl, haloalkenyl, alkoxyhaloalkyl and aryloxyhaloalkyl radicals of from 1 to 12 carbon atoms, R' is selected from the class consisting of —OR, —O—hydrocarbon and hydrocarbon radicals of from 1 to 12 carbon atoms and aromatic halohydrocarbon radicals of from 6 to 12 carbon atoms, and Z is selected from the class consisting of hydrogen, hydrocarbon, halohydrocarbon, cyanohydrocarbon, carboalkoxyhydrocarbon, alkoxyhydrocarbon and alkylthiohydrocarbon radicals of from 1 to 17 carbon atoms and the thienyl and furyl radicals.

3. A pentavalent phosphorus polyester of the formula:

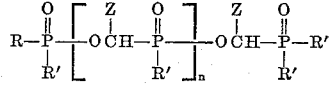

where R is selected from the class consisting of haloalkyl, haloalkenyl, alkoxyhaloalkyl and aryloxyhaloalkyl radicals of from 1 to 12 carbon atoms, R' is selected from the class consisting of —OR, —O—hydrocarbon and hydrocarbon radicals of from 1 to 12 carbon atoms and aromatic halohydrocarbon radicals of from 6 to 12 carbon atoms, Z is selected from the class consisting of hydrogen, hydrocarbon, halohydrocarbon, cyanohydrocarbon, carboalkoxyhydrocarbon, alkoxyhydrocarbon and alkylthiohydrocarbon radicals of from 1 to 17 carbon atoms and the thienyl and furyl radicals and $n$ is a number of at least 1.

4. A diphosphonate of the formula

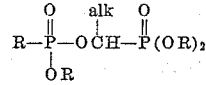

in which R is selected from the class consisting of haloalkyl, haloalkenyl, alkoxyhaloalkyl and aryloxyhaloalkyl radicals of from 1 to 12 carbon atoms and alk denotes an alkyl radical of from 1 to 17 carbon atoms.

5. A polyphosphonate of the formula

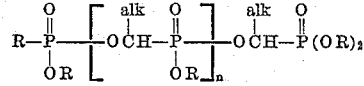

where R is selected from the class consisting of haloalkyl, haloalkenyl, alkoxyhaloalkyl and aryloxyhaloalkyl radicals of from 1 to 12 carbon atoms, and $n$ is a number of at least 1 and alk denotes an alkyl radical of from 1 to 17 carbon atoms.

6. A polyphosphonate of the formula

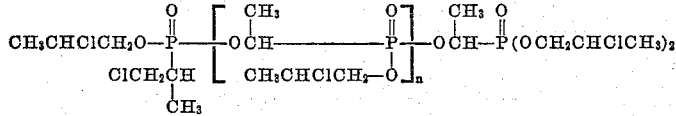

where $n$ has an average value of 2.

7. A polyphosphonate of the formula

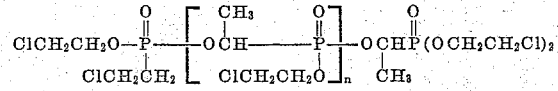

where $n$ has an average value of 2.

8. A polyphosphonate of the formula

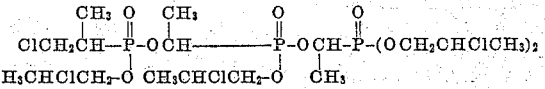

9. A diphosphonate of the formula

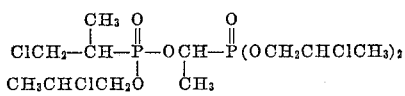

10. A diphosphinate of the formula

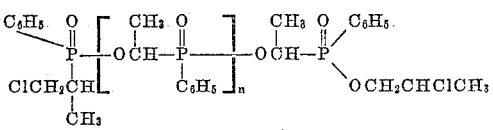

where n is 1.

11. A diphosphonate of the formula

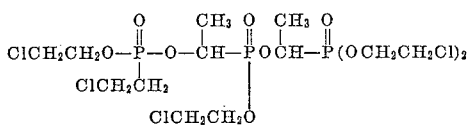

12. The method of preparing a pentavalent phosphorus diester of the formula

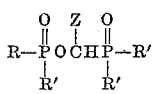

where R is selected from the class consisting of haloalkyl, haloalkenyl, alkoxyhaloalkyl and aryloxyhaloalkyl radicals of from 1 to 12 carbon atoms, R' is selected from the class consisting of —OR, —O—hydrocarbon and hydrocarbon radicals of from 1 to 12 carbon atoms and aromatic halohydrocarbon radicals of from 6 to 12 carbon atoms, Z is selected from the class consisting of hydrogen, hydrocarbon, halohydrocarbon, cyanohydrocarbon, carboalkoxyhydrocarbon, alkoxyhydrocarbon, and alkylthiohydrocarbon radicals of from 1 to 17 carbon atoms and the thienyl and furyl radicals, which comprises heating at a temperature of 135° C. to 225° C. a compound of the formula

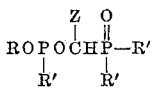

in which R, R' and Z are as herein defined.

13. The method of preparing a pentavalent phosphorus polyester of the formula

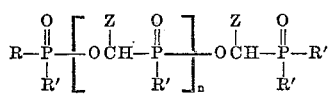

where R is selected from the class consisting of haloalkyl, haloalkenyl, alkoxyhaloalkyl and aryloxyhaloalkyl radicals of from 1 to 12 carbon atoms, R' is selected from the class consisting of —OR, —O—hydrocarbon and hydrocarbon radicals of from 1 to 12 carbon atoms and aromatic halohydrocarbyl radicals of from 6 to 12 carbon atoms, Z is selected from the class consisting of hydrogen, hydrocarbon, halohydrocarbon, cyanohydrocarbon, carboalkoxyhydrocarbon, alkoxyhydrocarbon and alkylthiohydrocarbon radicals of from 1 to 17 carbon atoms and the thienyl and furyl radicals and n is a number of at least 1, which comprises heating at a temperature of 135° C. to 225° C. a compound of the formula

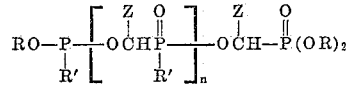

in which R, R', Z and n are as herein defined.

14. The method of preparing a polyphosphonate of the formula

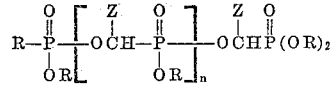

where R is selected from the class consisting of haloalkyl, haloalkenyl, alkoxyhaloalkyl and aryloxyhaloalkyl radicals of from 1 to 12 carbon atoms, Z is selected from the class consisting of hydrogen, hydrocarbon, halohydrocarbon, cyanohydrocarbon, carboalkoxyhydrocarbon, alkoxyhydrocarbon and alkylthiohydrocarbon radicals of from 1 to 17 carbon atoms and the thienyl and furyl radicals and n is a number of at least 1, which comprises heating at a temperature of 135° C. to 225° C. a compound of the formula

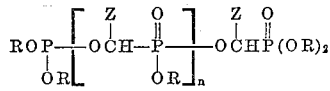

in which R, Z and n are as herein defined.

15. The method of preparing a polyphosphonate of the formula

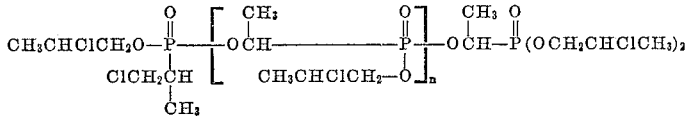

where n is at least 1, which comprises heating at a temperature of 135° C. to 225° C. a compound of the formula

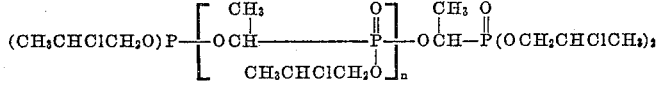

where n is as herein defined.

16. The method of preparing a diphosphonate of the formula

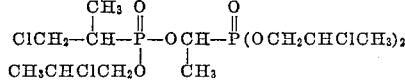

which comprises heating at a temperature of 135° C. to 225° C. a phosphite-phosphonate of the formula

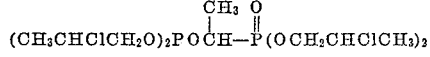

17. A hydrocarbon fuel composition comprising gasoline, an organolead antiknock therefor and, as a preignition-inhibiting agent, a pentavalent phosphorus ester selected from the class consisting of diesters of the formula

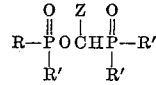

and polyesters of the formula

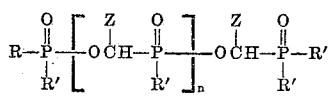

wherein R is selected from the class consisting of haloalkyl, haloalkenyl, alkoxyhaloalkyl and aryloxyhaloalkyl radicals of from 1 to 12 carbon atoms, R' is selected from the class consisting of —OR, —O—hydrocarbyl and hydrocarbyl radicals of from 1 to 12 carbon atoms and aromatic halohydrocarbyl radicals of from 6 to 12 carbon atoms, Z is selected from the class consisting of hydrogen, hydrocarbyl, halohydrocarbyl, cyanohydrocarbyl, carboalkoxyhydrocarbyl, alkoxyhydrocarbyl and alkylthiohydrocarbyl radicals of from 1 to 17 carbon atoms and the thienyl and furyl radicals and $n$ is a number of at least 1.

18. A hydrocarbon fuel composition comprising gasoline, an organolead antiknock therefor and, as a preignition-inhibiting agent, a pentavalent phosphorus ester of the formula

where R is a haloalkyl radical of from 1 to 12 carbon atoms, Z is an alkyl radical of from 1 to 17 carbon atoms, and $n$ is a number of at least 1.

19. A hydrocarbon fuel composition comprising gasoline, an organolead antiknock therefor and, as a preignition-inhibiting agent, a pentavalent phosphorus ester of the formula

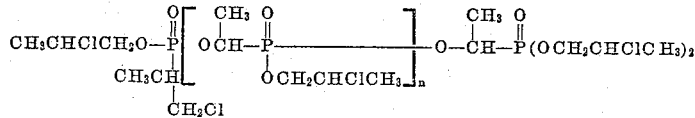

where $n$ has an average value of 1.

References Cited in the file of this patent
UNITED STATES PATENTS

| | | |
|---|---|---|
| 2,857,415 | Birum | Oct. 21, 1958 |
| 2,892,691 | Howell | June 30, 1959 |
| 2,897,071 | Gilbert | July 28, 1959 |
| 2,897,228 | Scott et al. | July 28, 1959 |
| 2,922,812 | Gilbert et al. | Jan. 26, 1960 |

UNITED STATES PATENT OFFICE
CERTIFICATE OF CORRECTION

Patent No. 3,014,956 December 26, 1961

Gail H. Birum

It is hereby certified that error appears in the above numbered patent requiring correction and that the said Letters Patent should read as corrected below.

Column 44, line 57, beginning with "17. A hydrocarbon" strike out all to and including "value of 1.", in line 14, column 46, comprising claims 17, 18, and 19; in the heading to the printed specification, for "19 Claims" read -- 16 Claims --.

Signed and sealed this 10th day of July 1962.

(SEAL)
Attest:

ERNEST W. SWIDER
Attesting Officer

DAVID L. LADD
Commissioner of Patents